US012563413B2

(12) United States Patent
Soldati et al.

(10) Patent No.: US 12,563,413 B2
(45) Date of Patent: Feb. 24, 2026

(54) MANAGING A WIRELESS DEVICE THAT IS OPERABLE TO CONNECT TO A COMMUNICATION NETWORK

(71) Applicant: Telefonaktiebolaget LM Ericsson (publ), Stockholm (SE)

(72) Inventors: Pablo Soldati, Solna (SE); Henrik Rydén, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 428 days.

(21) Appl. No.: 18/016,086

(22) PCT Filed: Jul. 9, 2021

(86) PCT No.: PCT/EP2021/069157
    § 371 (c)(1),
    (2) Date: Jan. 13, 2023

(87) PCT Pub. No.: WO2022/013093
    PCT Pub. Date: Jan. 20, 2022

(65) Prior Publication Data
    US 2023/0276264 A1      Aug. 31, 2023

Related U.S. Application Data

(60) Provisional application No. 63/050,910, filed on Jul. 13, 2020.

(51) Int. Cl.
    *H04W 24/02*        (2009.01)
    *G06N 20/00*        (2019.01)
    (Continued)

(52) U.S. Cl.
    CPC ............ *H04W 24/02* (2013.01); *G06N 20/00* (2019.01); *H04W 8/22* (2013.01); *H04W 36/0064* (2023.05)

(58) Field of Classification Search
    CPC ... H04W 24/02; H04W 36/0064; H04W 8/22; G06N 20/00
    (Continued)

(56) References Cited

U.S. PATENT DOCUMENTS

2009/0067367 A1      3/2009   Buracchini et al.
    2009/0104880 A1      4/2009   Abe et al.
    (Continued)

FOREIGN PATENT DOCUMENTS

WO      2019172813 A1      9/2019
    WO      2019228504 A1      12/2019
    (Continued)

OTHER PUBLICATIONS

Author Unknown, "Technical Specification Group Radio Access Network; Evolved Univeral Terrestrial Radio Access (E-UTRA) and Evolved Universal Terrestrial Radio Access Network (E-UTRAN); Overall description; Stage 2 (Release 16)," Technical Specification 36.300, Version 16.1.0, Mar. 2020, 3GPP Organizational Partners, 386 pages.
    (Continued)

*Primary Examiner* — Michael R Neff
(74) *Attorney, Agent, or Firm* — Sage Patent Group

(57)                ABSTRACT
A method is disclosed for managing a wireless device that is operable to connect to a communication network. The communication network comprises a Radio Access Network (RAN), and the method is performed by a first RAN node of the communication network. The method comprises receiving, from a second RAN node in the communication network, information indicating whether a wireless device is capable of executing a Machine Learning (ML) model that is operable to provide an output on the basis of which at least one RAN operation performed by the wireless device may be configured.

20 Claims, 16 Drawing Sheets

┌─ 100

┌─110
Receive, from a second RAN node in the communication network, information indicating whether a wireless device is capable of executing an ML model that is operable to provide an output on the basis of which at least one RAN operation performed by the wireless device may be configured Procedure for connection to communication network ─ 110a Mobility related procedure involving first RAN node (Handover, multi-connectivity, load balancing, RAT interoperability, CoMP) ─ 110b

(51) Int. Cl.
    *H04W 8/22*           (2009.01)
    *H04W 36/00*        (2009.01)

(58) Field of Classification Search
    USPC ...................................................... 455/422.1
    See application file for complete search history.

(56) References Cited

U.S. PATENT DOCUMENTS

| | | | | |
|---|---|---|---|---|
| 2010/0113024 A1* | 5/2010 | Wu | ................... | H04W 36/1443 |
| | | | | 455/436 |
| 2021/0022051 A1* | 1/2021 | Jia | ......................... | H04W 36/36 |
| 2021/0182658 A1* | 6/2021 | Wang | ..................... | G06N 3/045 |

FOREIGN PATENT DOCUMENTS

| | | | |
|---|---|---|---|
| WO | 2020080989 A1 | 4/2020 | |
| WO | 2020122669 A1 | 6/2020 | |
| WO | 2020139179 A1 | 7/2020 | |
| WO | 2020139181 A1 | 7/2020 | |
| WO | 2021107831 A1 | 6/2021 | |
| WO | 2022013090 A1 | 1/2022 | |
| WO | 2022013095 A1 | 1/2022 | |
| WO | 2022013104 A1 | 1/2022 | |
| WO | 2022015221 A1 | 1/2022 | |

OTHER PUBLICATIONS

Author Unknown, "Technical Specification Group Radio Access Network; Evolved Universal Terrestrial Radio Access Network (E-UTRAN); X2 application protocol (X2AP) (Release 16)," Technical Specification 36.423, Version 16.1.0, Mar. 2020, 3GPP Organizational Partners, 438 pages.

Author Unknown, "Technical Specification Group Radio Access Network; NG-RAN; Xn application protocol (XnAP) (Release 16)," Technical Specification 38.423, Version 16.1.0, Mar. 2020, 3GPP Organizational Partners, 334 pages.

CMCC, "RP-19xxxx: New SID: Study on data collection further enhancement," 3GPP TSG RAN Meeting #86, Sitges, Spain, Dec. 9-12, 2019, 4 pages.

Intel Corporation, "RWS-210373: AI/ML enabled RAN and NR Air Interface," 3GPP TSG RAN Release 18 Workshop, Jun. 28-Jul. 2, 2021, 12 pages.

Oppo, et al., "S1-193039: Discussion on AI/ML Model Transfer in 5GS," 3GPP SA WG1 #88, Nov. 18-22, 2019, Reno, Nevada, 13 pages.

International Search Report and Written Opinion for International Patent Application No. PCT/EP2021/069149, mailed Oct. 21, 2021, 13 pages.

International Search Report and Written Opinion for International Patent Application No. PCT/EP2021/069181, mailed Oct. 26, 2021, 11 pages.

International Search Report and Written Opinion for International Patent Application No. PCT/EP2021/069163, mailed Oct. 26, 2021, 11 pages.

International Search Report and Written Opinion for International Patent Application No. PCT/EP2021/069157, mailed Oct. 21, 2021, 12 pages.

International Search Report and Written Opinion for International Patent Application No. PCT/SE2021/050693, mailed Sep. 23, 2021, 12 pages.

\* cited by examiner

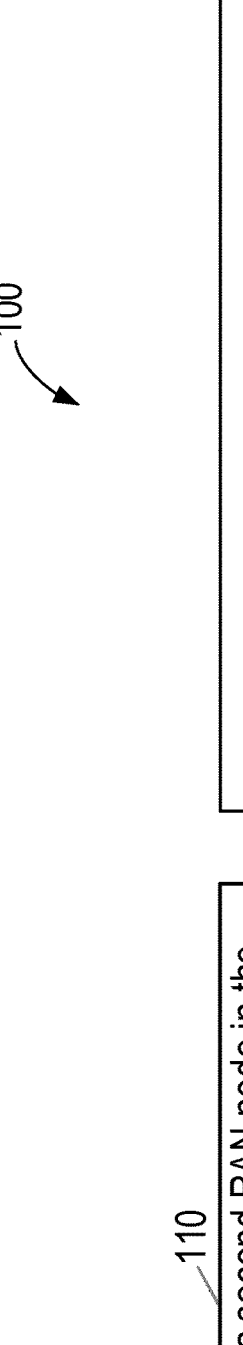

100

110

Receive, from a second RAN node in the communication network, information indicating whether a wireless device is capable of executing an ML model that is operable to provide an output on the basis of which at least one RAN operation performed by the wireless device may be configured 110a Procedure for connection to communication network 110b Mobility related procedure involving first RAN node (Handover, multi-connectivity, load balancing, RAT interoperability, CoMP)

Fig. 1

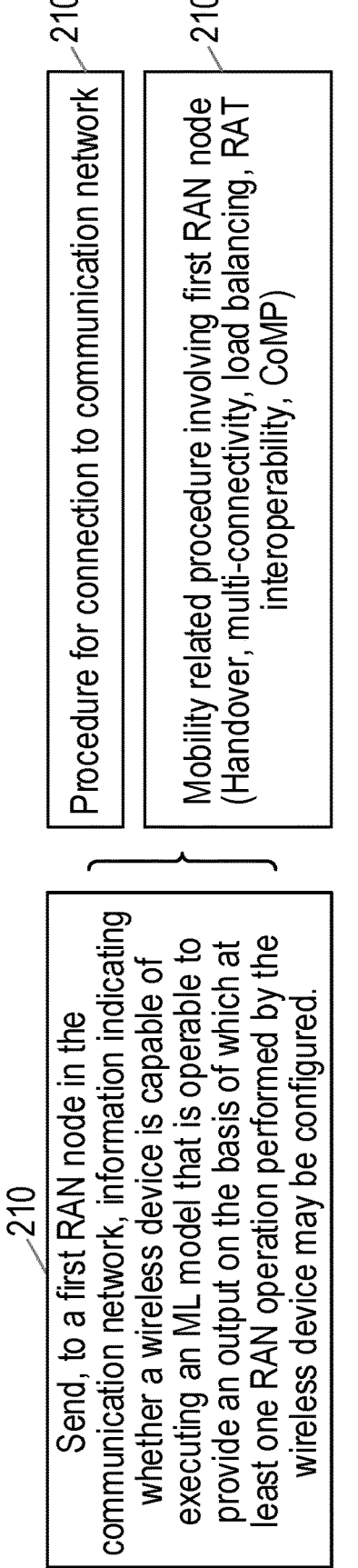

200

210

Send, to a first RAN node in the communication network, information indicating whether a wireless device is capable of executing an ML model that is operable to provide an output on the basis of which at least one RAN operation performed by the wireless device may be configured.

210a — Procedure for connection to communication network

210b — Mobility related procedure involving first RAN node (Handover, multi-connectivity, load balancing, RAT interoperability, CoMP)

Fig. 2

| | |
|---|---|
| 921 | Information indicating whether the wireless device is or has been configured to execute a RAN operation ML model |
| 922 | Information indicating whether the wireless device is or has been performing a RAN operation that is configured on the basis of an output of an ML model executed by the wireless device |
| 923 | Identification of a RAN operation performed by the wireless device and that the wireless device has configured, or is operable to configure, on the basis of an output of an ML model executed by the wireless device |
| 924 | Identification, for a RAN operation, of an ML model that the wireless device is configured to execute and on the basis of which the RAN operation may be configured |
| 925 | Identification of information reported by the wireless device that is based on an output of an ML model executed by the wireless device |
| 926 | Information about a RAN operation ML model that the wireless device is or has been configured to execute |
| 927 | Information about a capability of the wireless device to execute an ML model |

| | |
|---|---|
| 926a | Model type |
| 926b | Model identifier |
| 926c | RAN operation type which may be configured on basis of model |
| 926d | Model configuration parameter |
| 926e | Model performance parameter |
| 926f | Entity that provided configuration parameter of model |
| 926g | Entity that instructed instantiation of model |
| 926h | Time or location at which model was configured |
| 926i | Time or location at which model has been executed |
| 926j | Default model configuration |
| 926k | Capability of wireless device to train model |
| 926l | Indication of model training performed by wireless device |

Fig. 9c

MANAGING A WIRELESS DEVICE THAT IS OPERABLE TO CONNECT TO A COMMUNICATION NETWORK

This application is a 35 U.S.C. § 371 national phase filing of International Application No. PCT/EP2021/069157, filed Jul. 9, 2021, which claims the benefit of provisional patent application Ser. No. 63/050,910, filed Jul. 13, 2020, the disclosures of which are incorporated herein by reference in their entireties.

TECHNICAL FIELD

The present disclosure relates to methods for managing a wireless device that is operable to connect to a communication network, the methods performed by first and second Radio Access Network (RAN) nodes of the communication network. The present disclosure also relates to first and second RAN nodes for managing a wireless device that is operable to connect to a communication network, and to a computer program product configured, when run on a computer to carry out methods for managing a wireless device.

BACKGROUND

Machine Learning (ML) is a branch of Artificial Intelligence (AI), and refers to the use of algorithms and statistical models to perform a task. ML generally involves a training phase, in which algorithms build a computational operation based on some sample input data, and an inference phase, in which the computational operation is used to make predictions or decisions without being explicitly programmed to perform the task. Support for ML in communication networks is an ongoing challenge. The $3^{rd}$ Generation Partnership Project (3GPP) has proposed a study item on "Radio Access Network (RAN) intelligence (Artificial Intelligence/Machine Learning) applicability and associated use cases (e.g. energy efficiency, RAN optimization), which is enabled by Data Collection". It is proposed that the study item will investigate how different use cases impact the overall AI framework, including how data is stored across the different RAN nodes, model deployment, and model supervision. It is anticipated that use of AI will be a key component in future generations of communication networks, including $6^{th}$ and $7^{th}$ generation networks. How to deploy such intelligence across a RAN and its connected wireless devices is an open question.

Integrating the use of ML models into existing operational procedures involves several challenges, and there is currently no framework within 3GPP to support the use, at wireless devices, of ML models in the context of RAN operations.

SUMMARY

It is an aim of the present disclosure to provide methods, first and second RAN nodes and a computer readable medium which at least partially address one or more of the challenges mentioned above. It is a further aim of the present disclosure to provide methods, first and second RAN nodes and a computer readable medium which cooperate to facilitate the use, by a wireless device, of an ML model in the context of a RAN operation that may be performed by the wireless device.

According to a first aspect of the present disclosure, there is provided a method for managing a wireless device that is operable to connect to a communication network, wherein the communication network comprises a Radio Access Network (RAN). The method, performed by a first RAN node of the communication network, comprises receiving, from a second RAN node in the communication network, information indicating whether a wireless device is capable of executing a Machine Learning (ML) model that is operable to provide an output on the basis of which at least one RAN operation performed by the wireless device may be configured.

According to another aspect of the present disclosure, there is provided another method for managing a wireless device that is operable to connect to a communication network, wherein the communication network comprises a RAN. The method, performed by a second RAN node of the communication network, comprises sending, to a first RAN node in the communication network, information indicating whether a wireless device is capable of executing an ML model that is operable to provide an output on the basis of which at least one RAN operation performed by the wireless device may be configured.

According to another aspect of the present disclosure, there is provided a computer program product comprising a computer readable medium, the computer readable medium having computer readable code embodied therein, the computer readable code being configured such that, on execution by a suitable computer or processor, the computer or processor is caused to perform a method according to any one of the aspects or examples of the present disclosure.

According to another aspect of the present disclosure, there is provided a first RAN node of a communication network comprising a RAN, wherein the first RAN node is for managing a wireless device that is operable to connect to the communication network. The first RAN node comprises processing circuitry configured to cause the first RAN node to receive, from a second RAN node in the communication network, information indicating whether a wireless device is capable of executing a Machine Learning, ML, model that is operable to provide an output on the basis of which at least one RAN operation performed by the wireless device may be configured.

According to another aspect of the present disclosure, there is provided a second RAN node of a communication network comprising a RAN, wherein the second RAN node is for managing a wireless device that is operable to connect to the communication network. The second RAN node comprises processing circuitry configured to cause the second RAN node to send, to a first RAN node in the communication network, information indicating whether a wireless device is capable of executing a Machine Learning, ML, model that is operable to provide an output on the basis of which at least one RAN operation performed by the wireless device may be configured.

Aspects of the present disclosure thus provide a framework for supporting the provision, to a first RAN node from a second RAN node, of information relating to the use and/or execution of ML models, including algorithms, at a wireless device. Such information may inform subsequent management of the wireless device by the first RAN node, configuration and execution of wireless device ML models, configuration of RAN operations performed by the wireless device, processing of reports provided by the wireless device, etc.

For the purposes of the present disclosure, the term "ML model" encompasses within its scope the following concepts:

Machine Learning algorithms, comprising processes or instructions through which data may be used in a training process to generate a model artefact for performing a given task, or for representing a real world process or system;

the model artefact that is created by such a training process, and which comprises the computational architecture that performs the task; and the process performed by the model artefact in order to complete the task. References to "ML model", "model", model parameters", "model information", etc., may thus be understood as relating to any one or more of the above concepts encompassed within the scope of "ML model".

BRIEF DESCRIPTION OF THE DRAWINGS

For a better understanding of the present disclosure, and to show more clearly how it may be carried into effect, reference will now be made, by way of example, to the following drawings in which:

FIG. 1 is a flow chart illustrating process steps in a method performed by a first RAN node for managing a wireless device;

FIG. 2 is a flow chart illustrating process steps in a method performed by a second RAN node for managing a wireless device;

FIGS. 9*a* to 9*c* show a flow chart illustrating process steps in another example of a method performed by a first RAN node for managing a wireless device;

DETAILED DESCRIPTION

Figure 3:
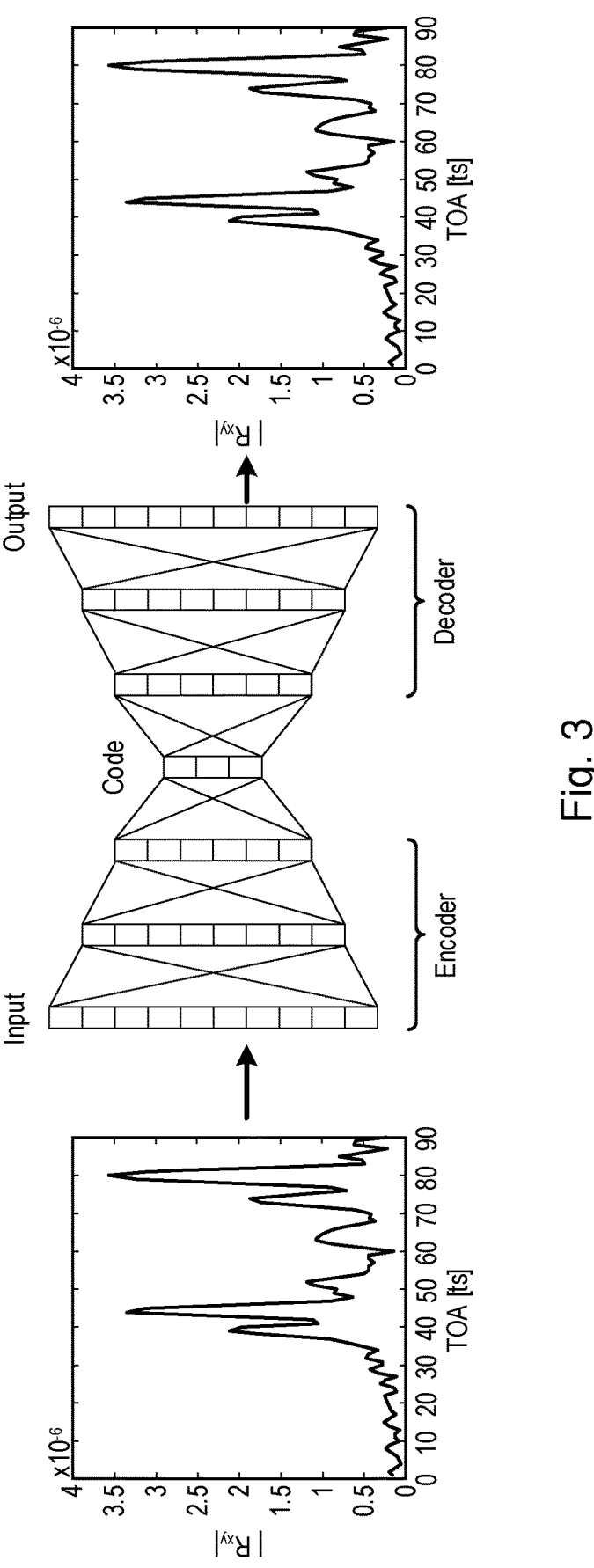
FIG. 3 illustrates an example autoencoder for CSI compression.

FIG. 1 is a flow chart illustrating process steps in a method 100 for managing a wireless device that is operable to connect to a communication network, wherein the communication network comprises a Radio Access Network (RAN). The method is performed by a first RAN node of the communication network. A RAN node of a communication network comprises a node that is operable to transmit, receive, process and/or orchestrate wireless signals. A RAN node may comprise a physical node and/or a virtualised network function. In some examples, a RAN node may comprise a base station node such as a NodeB, eNodeB, gNodeB, or any future implementation of the above discussion functionality. Referring to FIG. 1, the method 100 comprises, in step 110, receiving, from a second RAN node in the communication network, information indicating whether a wireless device is capable of executing a Machine Learning (ML) model that is operable to provide an output on the basis of which at least one RAN operation performed by the wireless device may be configured. As illustrated at 110*a* and 110*b*, the wireless device may be a candidate for at least one of connection to the communication network and/or a mobility related procedure involving the first RAN node, and the information received at step 110 may be received in the context of, prior to, or in some examples during, a connection and/or mobility related procedure for the wireless device. As illustrated at 110*b*, the mobility related procedure may comprise at least one of a Handover procedure, a multi-connectivity procedure, a load balancing procedure, a Radio Access Technology (RAT) inter-operability procedure and/or a Coordinated MultiPoint (CoMP) procedure. As such, the mobility within the communication network may relate to mobility between locations in the network, and consequent Handover between service areas such as cells, or to mobility between serving nodes for other reasons, for example as part of random access, Radio Resource Control (RRC) connection setup, handover, tracking area change, Load Balancing, multi-connectivity such as Dual Connectivity, etc. In some examples, the information may be provided for a plurality of wireless devices. In still further examples, the information indicating whether a wireless device is capable of executing an ML model that is operable to provide an output on the basis of which at least one RAN operation performed by the wireless device may be configured may comprise information indicating such a capability for any wireless device that is being served by the second RAN node. For example, the information may indicate whether any wireless device camping in a cell controlled by the second RAN node has the above discussed capability.

The information received in step 110 may indicate the capability of the wireless device in a variety of different ways, depending upon a particular implementation or use case. In some examples, the indication of capability may be provided as a single bit of information, for example a flag that is set if a wireless device, any wireless device, or a specific wireless device has the capability, and not set otherwise. In other examples, the information may include additional detail regarding the capability of a, any or the wireless device. In still further examples, the indication of capability may be implicit, through the inclusion in the information of detail about use or configuration of ML models at the wireless device or devices. Different options for the information that may be conveyed to serve as an indication of capability, or to supplement the indication with additional detail, are discussed in detail below with reference to FIGS. 9*a* to 9*c* and various example use cases and implementations.

The RAN operation performed by the wireless device, which operation may be configured on the basis of an output of an ML model, may be configured by the wireless device itself or by a node of the communication network, which may be the first RAN node that is performing the method 100. A RAN operation may comprise any operation that is at least partially performed by the wireless device in the context of its connection to the Radio Access Network. For example, a RAN operation may comprise a connection operation, a mobility operation, a reporting operation, a resource configuration operation, a synchronisation operation, a traffic management operation etc. Specific examples of RAN operations may include Handover, secondary carrier prediction, geolocation, signal quality prediction, beam measurement and beamforming, traffic prediction, Uplink synchronisation, channel state information compression, wireless signal reception/transmission, etc. Any one of more of these example operations or operation types may be configured on the basis of an output of an ML model. For example, the ML model may predict certain measurements, on the basis of which decisions for RAN operations may be taken. Such measurements may be used by the wireless device and/or provided to the first RAN node performing the method 100. In further examples, the timing or triggering of a RAN operation may be based upon a prediction output by an ML model.

In some examples of the method 100, as discussed in further detail below, the method 100 may further comprise requesting the information received from the second RAN node, and may further comprise receiving supplementary ML model information from the second RAN node, the supplementary ML model information including a range of elements relating to the configuration and/or execution of ML models at the wireless device. According to examples of the present disclosure, the information received at step 110 may be received in a dedicated message, or may be included in a message containing other information that is received from the second RAN node. Examples of messages in which the information may be included are discussed later in the present disclosure.

The method 100 may be complemented by a method 200 performed by a second RAN node. FIG. 2 is a flow chart illustrating process steps in another method 200 for managing a wireless device that is operable to connect to a communication network, wherein the communication network comprises a RAN. The method 200 is performed by the second RAN node. Referring to FIG. 2, the method 200 comprises, in a first step 210, sending, to a first RAN node in the communication network, information indicating whether a wireless device is capable of executing an ML model that is operable to provide an output on the basis of which at least one RAN operation performed by the wireless device may be configured. As illustrated at 210a and 210b, the wireless device may be a candidate for at least one of connection to the communication network and/or a mobility related procedure involving the first RAN node, and the information sent at step 210 may be sent in the context of, prior to, or in some examples during, a connection and/or mobility related procedure. As illustrated at 210b, the mobility related procedure may comprise at least one of a Handover procedure, a multi-connectivity procedure, a load balancing procedure, a Radio Access Technology (RAT) inter-operability procedure and/or a Coordinated MultiPoint (CoMP) procedure. As such, the mobility within the communication network may relate to mobility between locations in the network, and consequent Handover between service areas such as cells, or to mobility between serving nodes for other reasons, for example as part of random access, Radio Resource Control (RRC) connection setup, handover, tracking area change, Load Balancing, multi-connectivity such as Dual Connectivity, etc. The information sent in step 210 may indicate the capability of the wireless device in a variety of different ways, depending upon a particular implementation or use case. Further detail of what may be included in the information is discussed above, with reference to FIG. 1 and below with reference to FIGS. 9a to 9c. As discussed with reference to FIG. 1 above, in some examples, the information may be provided for a plurality of wireless devices. In still further examples, the information indicating whether a wireless device is capable of executing an ML model that is operable to provide an output on the basis of which at least one RAN operation performed by the wireless device may be configured may comprise information indicating such a capability for any wireless device that is being served by the second RAN node. For example, the information may indicate whether any wireless device camping in a cell controlled by the second RAN node has the above discussed capability.

According to examples of the present disclosure, the information sent at step 210 may be sent in a dedicated message, or may be included in a message containing other information that is sent to the first RAN node. Examples of messages in which the information may be included are discussed later in the present disclosure.

The methods 100 and 200 provide a solution for signalling, between RAN nodes, information associated to ML models, including algorithms, that are available at and/or executed by a wireless device to perform radio network operations, including for example producing information reported to the network. This information may for example be signalled in the context of network operations related to mobility procedures, such as handover or secondary cell change for dual connectivity. According to difference examples of the methods 100, 200, the first RAN node may request or trigger a signalling exchange with the second RAN node for exchanging the information associated to the capability, configuration and use of machine learning models at the wireless devices involved in mobility operations or procedures. Gathering such information may enable the RAN node to take actions that assist in optimising operation of the RAN and the RAN node itself, as well as optimising configuration of the wireless device. Example methods of the present disclosure may consequently improve overall system performance, as well as interoperability across network equipment of different kind. In some examples of the resent disclosure, the transferred information may enable the first RAN node to identify whether information reported by a wireless device has been produced and/or determined on the basis of an ML model/algorithm, as opposed to being based on, for example, on direct radio measurements.

The ML models of that are the subject of the present disclosure are models that are operable to provide an output on the basis of which a RAN operation performed by a wireless device may be configured. Examples of RAN operations performed by a wireless device that could be executed in accordance with an output of an ML model according to the present disclosure are presented below. The following discussion divides the example RAN operations into those which are both trained and executed by the wireless device (referred to in the following discussion as a User Equipment or UE), and those which are trained by a node of the communication network of which the RAN is a part, and subsequently downloaded to a wireless device for execution.

ML Model Trained and Executed by UE

Some AI/ML capable UEs are able to build intelligence that can be used to improve the radio network operation, as in the following examples:

Example 1: Lower Latency Via Traffic Prediction

In delay critical applications it is important not to lose Uplink synchronisation immediately before or during arrival of data, as synchronising the Uplink prior to Uplink transmission increases delay. One solution to this issue is to force a UE to perform synchronisation if no Uplink transmission has taken place within a certain time window. However, this can lead to a large increase of signalling and interference related to unnecessary uplink synchronisation. A UE could instead predict data arrival using an ML model, and consequently ensure that Uplink synchronisation is completed before the predicted data arrival. The traffic experienced by one UE can be used to train a model that predicts when synchronisation, or in general when Uplink resources may be required. A UE could for example send a scheduling request if traffic is expected based on executed ML model, and so reduce its latency. In such examples, the RAN operation that may be configured on the basis of an output of the ML model would be Uplink synchronisation, and its configuration would be the timing of the synchronisation, to coordinate with traffic predictions provided by the model.

Example 2: Mobility Prediction

UEs typically move along similar trajectories each day, representing daily or weekly movement patterns of users. Instead of measuring signal strengths of neighbouring cells, a UE could therefore use its geo-location an input to predict the signal strength of a particular reference signal (for example the $5^{th}$ generation 3GPP Synchronisation Signal Block (SSB) for a radio base station). The predicted signal strength can then be used to trigger different events, such as a handover decision. In this example, the RAN operation that may be configured on the basis of an output of the ML model would be handover, and its configuration would be the timing of the handover decision, on the basis of predicted signal strength from the ML model.

Example 3: Beam Management

A UE may use an ML model to reduce its measurement requirements related to beamforming. In the RAN of a 5th Generation 3GPP network, referred to as New Radio (NR), it is possible to request a wireless device such as a UE to perform measurements on a set of Channel State Information Reference Signal (CSI-RS) beams. A stationary UE may experience a static environment and consequently minimal change in beam quality. The UE can therefore save battery by reducing beam measurements: using an ML model to predict beam strength instead of measuring it. A UE may for example measure a subset of beams and use an ML model to predict measurements for remaining beams.
ML Model Trained by Communication Network and Signalled to UE for Execution
As mentioned in a non-published reference document, several use cases may benefit from training an ML model at the communication network, and then signalling the model to a wireless device for execution.

Example 4: Secondary Carrier Prediction

In order to detect a node on another frequency using target carrier prediction, a UE is required to perform signalling of source carrier information. For example a mobile UE may periodically transmit source carrier information in order to enable a macro node to handover the UE to another node operating at a higher frequency. Using target carrier prediction, the UE would not need to perform inter-frequency measurements, leading to energy savings at the UE. Frequent signalling of source carrier information that would enable predicting the secondary frequency can lead to an additional overhead and should thus be minimized. However, there is a risk that if frequent periodic signalling is not performed, an opportunity for inter-frequency handover to a less-loaded cell on another carrier may be missed. For example, if the reporting periodicity is too high, the UE may not report any source carrier measurement when inside the coverage region of a less loaded cell. According to examples of the present disclosure, the UE could be configured with an ML model, and use source carrier information as input to the model, which then triggers an output indicating coverage on the less loaded cell. This reduces the need for frequent source carrier information signalling, while enabling the UE to predict the coverage on the target cell.

Example 5: Privacy-Conserving Use of Geo-Location

UE location may be used to predict conditions on possible alternative RAN nodes that the UE could connect to. In the case of an ML model that is trained at the network, the necessary transfer of data may give rise to privacy concerns, and federated learning may therefore be used, as discussed in a non-published reference document.

Example 6: Signal Quality Drop Prediction

Based on received UE data from measurement reports, the network can learn for example what sequences of signal quality measurements (e.g. the Reference Signal Received Power, RSRP) result in a large signal quality drop, for example when turning around a corner. Predicted future signal quality values can be used to: initiate an interfrequency handover; set handover and/or reselection parameters; and/or change the UE scheduler priority, for example scheduling the second UE at a time when the expected signal quality is good.

Example 7: Compression of Channel State Information (CSI)

It has been proposed in a non-published reference document to use Autoencoders to compress CSI for enhanced beamforming. An autoencoder is a type of machine learning algorithm that may be used to learn efficient data representations, that is to concentrate data. Autoencoders are trained to take a set of input features and reduce the dimensionality of the input features, with minimal information loss. An autoencoder is divided into two parts, an encoding part or encoder and a decoding part or decoder. The encoder and decoder may comprise, for example, deep neural networks comprising layers of neurons. An encoder successfully encodes or compresses the data if the decoder is able to restore the original data stream with a tolerable loss of data. One example of an autoencoder comprising an encoder/decoder for CSI compression is illustrated in FIG. 3. At the UE, the measured absolute values of the Channel Impulse Response (CIR) are input to the encoder part to be compressed to a code. This code is reported to a radio RAN node, which uses a corresponding decoder part of the autoencoder to reconstruct the measured CIR. The radio node may then perform beamforming based on the decoded code (CIR).
In a further proposal, the methods described above may be developed for compressing a channel in order to improve the Observed Time Difference of Arrival (OTDOA) positioning accuracy in a multipath environment. OTDOA is one of the positioning methods introduced for Long Term Evolution (LTE) networks in 3GPP specification Release 9. The richer channel information provided by OTDOA can enable the network to test multiple hypotheses for position estimation at the network side, which increases the potential for a more accurate position estimation. For channel compression, the encoder part of the autoencoder, once rained at the network, is signalled for execution to the UE.

Example 8: Encoding/Decoding of Wireless Signals

In future generations of wireless networks, it is anticipated that an ML model may be used to encode/decode wireless signals directly. This is in contrast to existing systems, such as $5^{th}$ generation NR, in which steps in the receiver chain including source decoder, channel decoder and de-modulator (analog to digital) are specified. The existing building blocks for the receiver chain, or parts of the existing building blocks, could be replaced with an ML model. This replacement would allow joint optimisation, enabling sharing of information across different layers, and so achieving higher flexibility and reducing the handcrafted design of each block. The high-level overview of such procedure is illustrated in FIG. 4.

Figure 4:
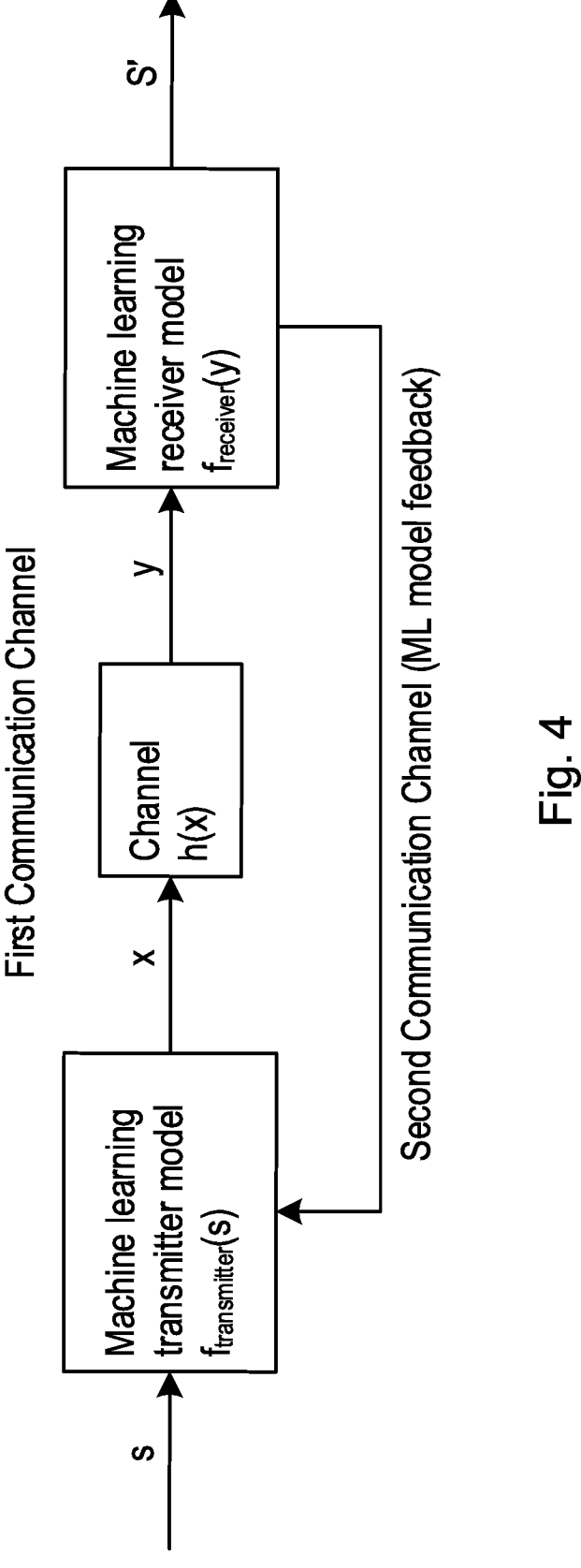
FIG. 4 illustrates an overview of use of an ML model to encode/decode wireless signals directly.

Referring to FIG. 4, a wireless device can receive from a radio RAN node a receiver model detailing how to process a received wireless signal y, or a transmitter model detailing how to generate a wireless signal x, in order to transmit the device's data symbols s. Feedback in the form of information on the ML model performance can be signalled via a second communication channel, such as NR RRC protocol, or LTE, or Wifi. This feedback can be used to improve the ML model. The model or models can be sent to the device over the same second communication channel. In this example (e.g. using NR SIB/RRC), the first communication channel is used to transmit data to the device, while the second communication channel provides the control information (for example the models used in the first communication channel).

The above examples demonstrate some of the use cases in which ML models may support RAN operations, and consequently in which methods according to examples of the present disclosure may support the implementation and orchestration of ML models to optimise such RAN operations.

There now follows a discussion of certain mobility/connectivity procedures in the context of which the information of the methods 100 and 200 may be exchanged.

Basic mobility procedures in Long Term Evolution (LTE) and New radio (NR)

Handover Preparation

Figure 5:
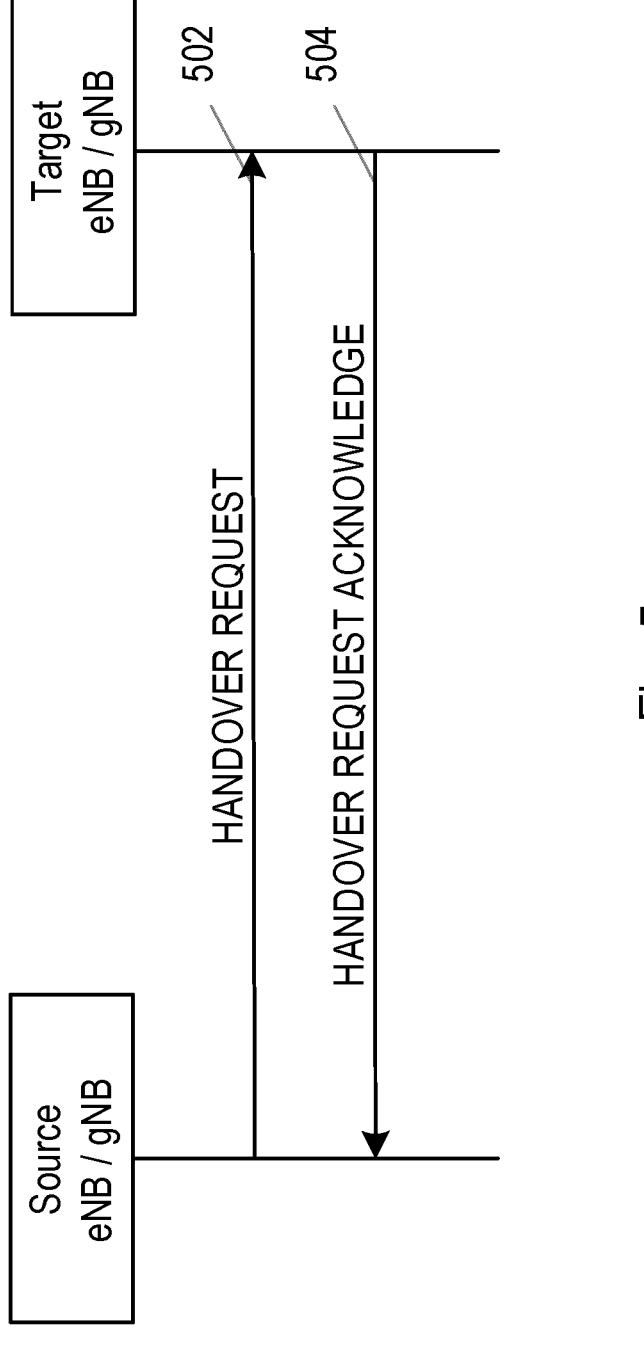
FIG. 5 is a signalling diagram illustrating a signalling exchange in a handover procedure.

This procedure is used to establish necessary resources in an LTE eNB or a NR gNB for an incoming handover of a wireless device from a neighbouring RAN node. An illustration of a successful handover preparation event, as described in 3GPP TS 36.423 for LTE and 3GPP TS 38.423 for NR, is provided in FIG. 5. In the example of FIG. 5, the source RAN node, such as a 3GPP eNB node or a 3GPP NR gNB node, initiates the procedure by sending a HANDOVER REQUEST message 502 to the target RAN node (i.e., a 3GPP eNB node or a 3GPP NR gNB node, respectively). When the source RAN node sends the HANDOVER REQUEST message, it starts the timer TRELOCprep. In the event of a successful handover preparation, the target RAN node transmits a HANDOVER REQUEST ACKNOWLEDGE message 504 to the source RAN node, as shown in FIG. 5. Otherwise, the target RAN node transmits a HANDOVER PREPARATION FAILURE message as described, for example, in FIG. 8.2.1.3-1 of the 3GPP TS 36.423 for the LTE standard.

The procedure of FIG. 5 uses UE-associated signalling, and as such the HANDOVER REQUEST message may comprise a number of user specific information elements (IE) which are used by the target RAN node to serve the wireless device in case of successful handover preparation. Examples of user specific IE used for handover preparation include:

Subscriber Profile ID for RAT/Frequency priority IE, if available;

The Additional RRM Policy Index;

UE History Information IE: upon receiving such IE, the target RAN node collects the information defined as mandatory in the UE History Information IE and, if supported, collects the information defined as optional in the UE History Information IE, for as long as the UE stays in one of its cells, and stores the collected information to be used for future handover preparations;

the UE History Information from the UE IE;

the Mobility Information IE;

the Expected UE Behaviour IE;

the UE Context Reference at the SeNB IE

If the Bearer Type IE

Etc.

A complete list of user specific information elements exchanged between RAN nodes during an handover preparation event is provided in 3GPP TS 36.423 and in 3GPP TS 38.423 technical specifications for 3GPP LTE and 3GPP NR systems, respectively.

Dual Connectivity (DC)

In dual connectivity, a wireless device can be served simultaneously by multiple RAN nodes. In the LTE system, for example, a master eNB (MeNB) provides an RRC anchor point for the wireless device as well as a data channel connection (in either downlink, uplink or both), while a secondary eNB (SeNB) provides a secondary shared data channel connection to increase the user data rate and improve experience. In order to establish dual connectivity for a wireless device, the 3GPP LTE and NR standards define some basic procedures to add a SeNB/SgNB for a wireless device, the added SeNB/SgNB starting to serve the wireless device in dual connectivity mode, as well as procedures to continue serving the wireless device in dual connectivity mode while the wireless device moves in the network. These additional procedures define how to change the SeNB/SgNB or the MeNB as the wireless device mores. For example, for intra E-UTRAN dual connectivity procedure, the following procedures are provided:

Addition of SeNB

MeNB initiated SeNB modification

SeNB initiated SeNB modification

MeNB initiated SeNB release

SeNB initiated SeNB release

During each of the above procedures, UE associated information is exchanged between two RAN nodes.

Similar procedures are defined for E-UTRAN-NR Dual Connectivity wherein an SgNB is involved instead of an SeNB. In the following discussion, the intra-E-UTRAN Dual Connectivity procedures are briefly reviewed; reference is made to 3GPP TS 36.423 for a complete survey of the dual connectivity procedures including E-UTRAN-NR Dual Connectivity.

SeNB Addition Preparation

Figure 6:
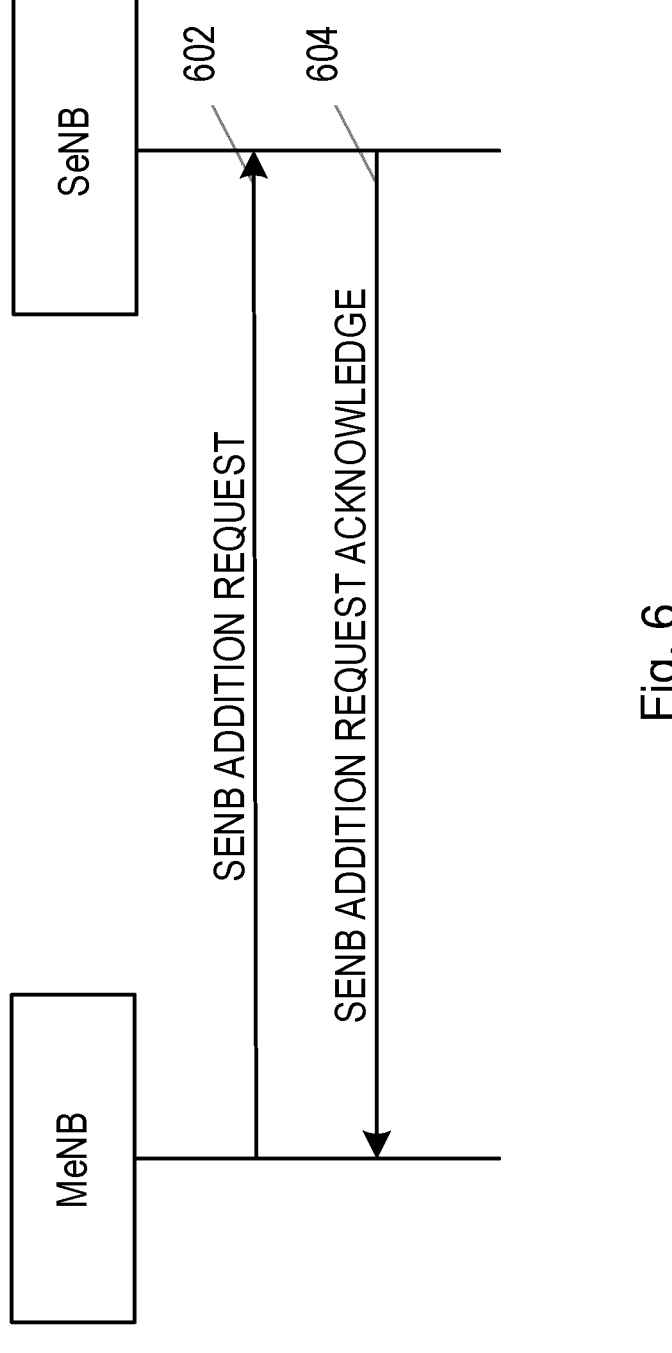
FIGS. 6 to 8 are signalling diagrams illustrating signalling exchanges in dual connectivity procedures.

The purpose of the SeNB Addition Preparation procedure is to request an SeNB to allocate resources for dual connectivity operation for a specific UE. FIG. 6 illustrates the basic signalling required to establish dual connectivity for a wireless device in the 3GPP LTE system (see FIG. 8.6.1.2-1 in 3GPP TS 36.423). The MeNB initiates the procedure by sending an SENB ADDITION REQUEST message 602 to the SeNB.

In the event of a successful dual connectivity establishment, the SeNB responds to the MeNB with a SENB ADDITION REQUEST ACKNOWLEDGE message 604. User specific information elements are provided by the MeNB to the SeNB as part of the SENB ADDITION REQUEST message 602. If the SeNB is not able to accept any of the bearers, or a failure occurs during the SeNB Addition Preparation, the SeNB sends an SENB ADDITION REQUEST REJECT message with an appropriate cause value to the MeNB.

MeNB Initiated SeNB Modification

Figure 7:
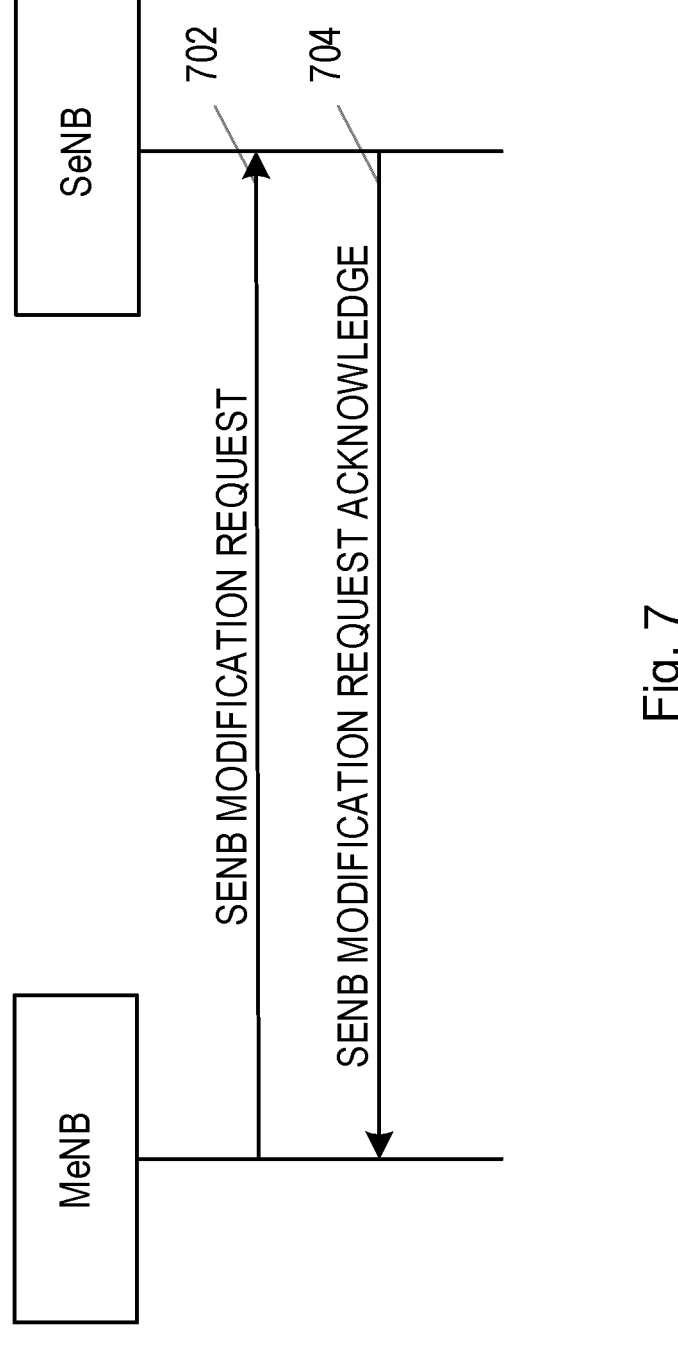

This procedure is used to enable an MeNB to request an en-gNB to modify the UE context at the en-gNB, or to query the current Secondary Cell Group (SCG) configuration for supporting delta signalling in MeNB initiated SgNB change, or to provide SeNB Radio Link Failure (S-RLF)-related information to the en-gNB. FIG. 7 illustrates the basic signalling required for the dual connectivity MeNB initiated SeNB modification procedure for a wireless device in 3GPP LTE system (see FIG. 8.6.3.2-1 in 3GPP TS 36.423). The SENB MODIFICATION REQUEST message 702 may contain several user specific information elements, such as UE Context Information IE.

SeNB Initiated SeNB Modification

Figure 8:
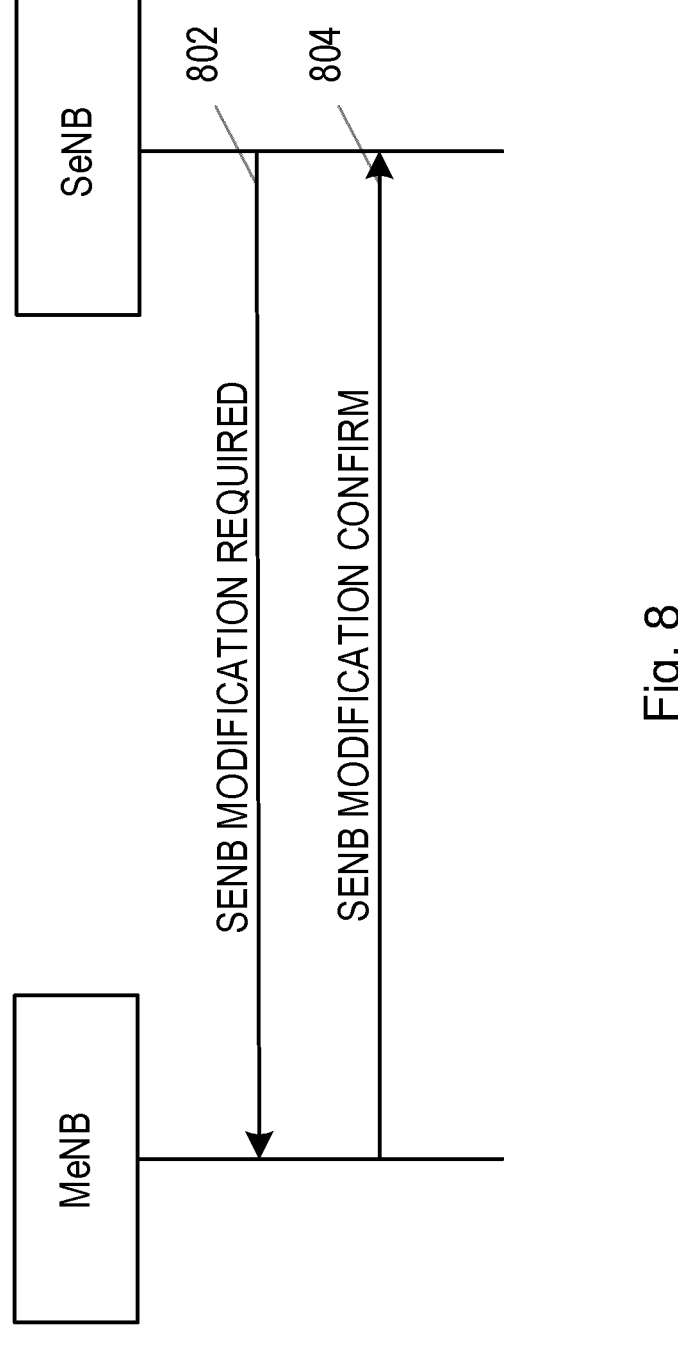

FIG. 8 illustrates the basic signalling required for the dual connectivity SeNB initiated SeNB modification procedure for a wireless device in 3GPP LTE system (see FIG. 8.6.4.2-1 in 3GPP TS 36.423). This procedure is used by an SeNB to modify the UE context in the SeNB, and uses UE-associated signalling.

The SeNB initiates the procedure by sending the SENB MODIFICATION REQUIRED message 802 to the MeNB. If an MeNB receives a SENB MODIFICATION REQUIRED message containing the SCG Change Indication IE, the MeNB acts as specified in the 3GPP TS 36.300. If the MeNB is able to perform the modifications requested by the SeNB, the MeNB sends the SENB MODIFICATION CONFIRM message 804 to the SeNB. The SENB MODIFICATION CONFIRM message 804 may contain the MeNB to SeNB Container IE.

The above discussion illustrates mobility procedures in the context of which wireless device ML capability related information may be exchanged using methods according to the resent disclosure. For example, the information indicating wireless device ML capability may be requested and provided via the inclusion in above discussed messages of specific IEs relating to the request and provision of such information. There now follows a more detailed discussion of examples of methods 900, 100 which may be performed by first and second RAN nodes in accordance with examples of the present disclosure.

Figure 9A:
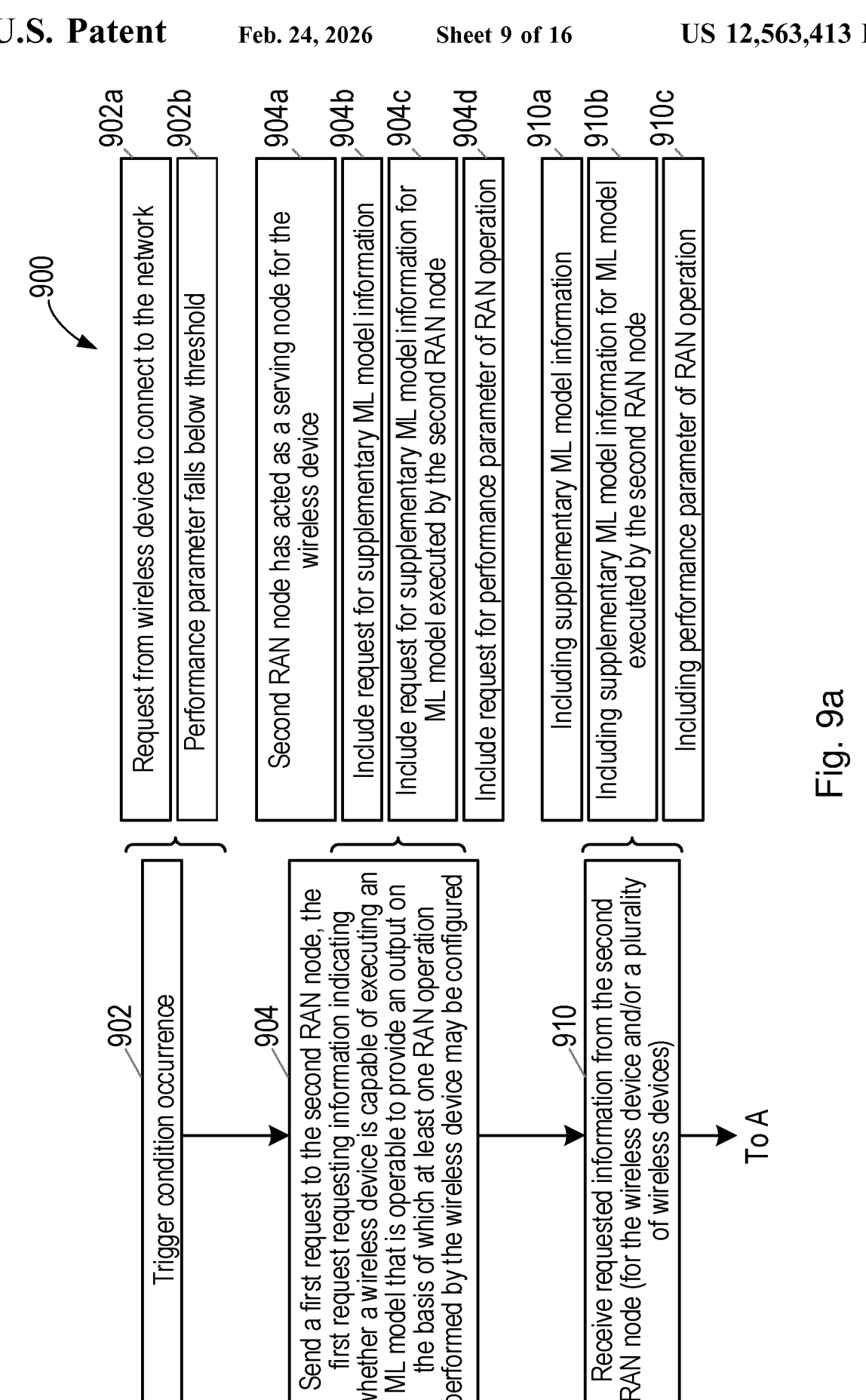
Figure 9B:
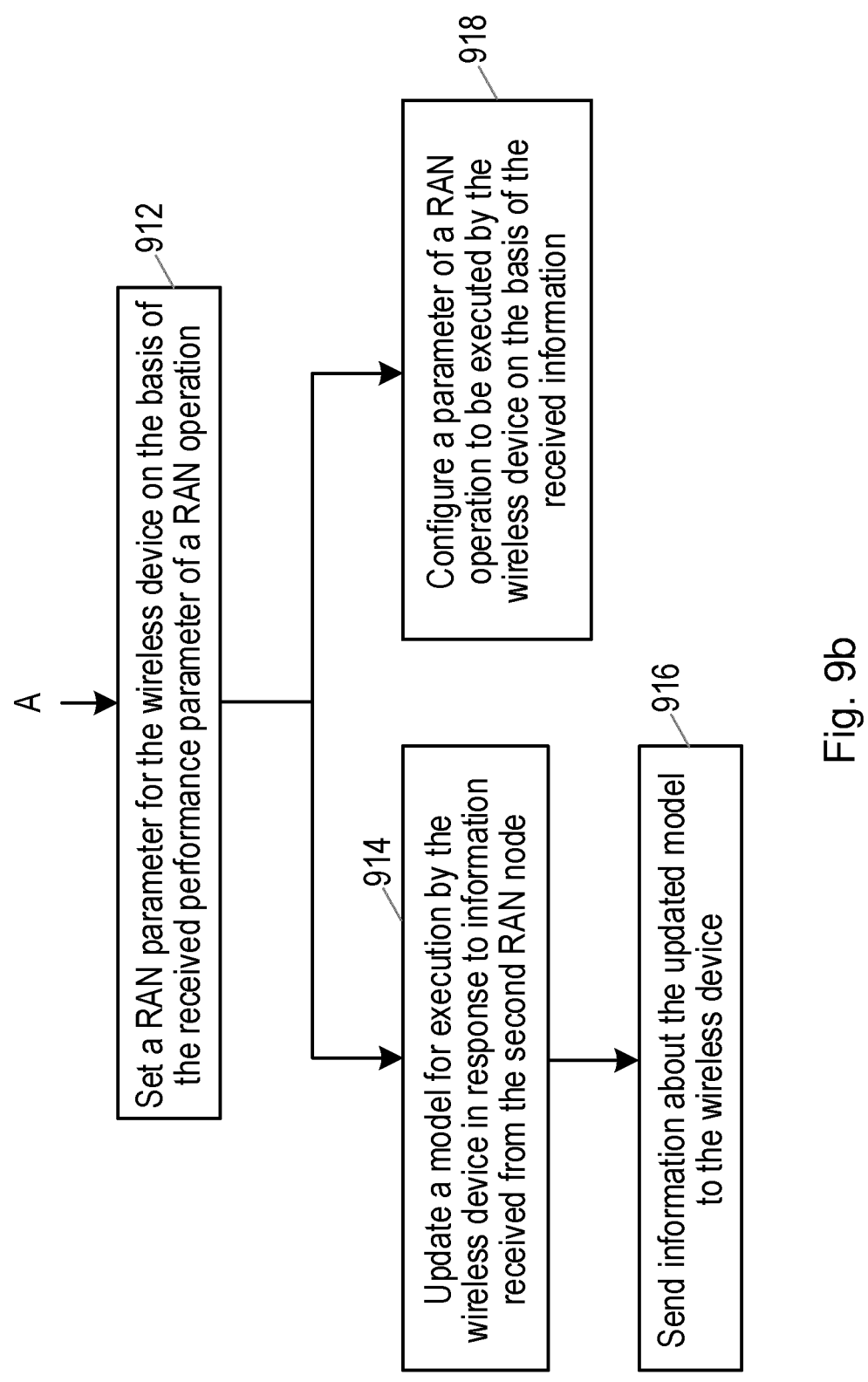

FIGS. 9*a* to 9*c* show a flow chart illustrating process steps in another example of method 900 for managing a wireless device that is operable to connect to a communication network, wherein the communication network comprises a RAN. The method 900 may enable management of more than one wireless device. The method 900 provides various examples of how the steps of the method 100 may be implemented and supplemented to achieve the above discussed and additional functionality. As for the method 100, the method 900 is performed by a first RAN node of the communication network, which may comprise a physical node and/or a virtualised network function, as discussed above.

Referring first to FIG. 9*a*, in a first step 902, the first RAN node detects occurrence of a trigger condition. The trigger condition may comprise at least one of a request from the wireless device to connect to the network, as illustrated at 902*a*, or a performance parameter for a RAN operation performed in relation to the wireless device falling below a threshold, as illustrated at 902*b*. For example, UE reported measurements on a carrier other than its serving carrier could fail to match the expected measurements for the carrier. In another example, UE beamforming gain could fail to match the beamforming gain of other UEs served by the first node. This could arise if the UE is reporting inaccurate reference signal measurements generated by an outdated or invalid ML model. In step 904, the first RAN node sends a first request to a second RAN node in the communication network, the first request requesting information indicating whether the wireless device is capable of executing an ML model that is operable to provide an output on the basis of which at least one RAN operation performed by the wireless device may be configured. As illustrated at 904*a*, the second RAN node may have acted as a serving node for the wireless device. The second RAN node may be the last serving node of the wireless device before a previous disconnection from the network, for example in the context of a connection request. In another example, the second RAN node may still be the serving node of the wireless device, with the UE camping in the coverage area of cells controlled by the second RAN node. This may be the case for example if the wireless device is a candidate for handover from the second RAN node to the first RAN node. In a still further example, the second RAN node may be an MeNB/MgnB or SeNB/SgNB, and a multi-connectivity procedure may be taking place to add or modify the first RAN node as a SeNB/SgNB for the wireless device.

As illustrated at 904*b*, the first RAN node may include in the first request a request for supplementary ML model information for an ML model operable for execution by the wireless device. The ML model may be an ML model that the wireless device is configured to execute, can be configured to execute, has executed in the past, etc. Supplementary ML model information is discussed in further detail below with reference to FIG. 9*c*. In a further example, as illustrated at 904*c*, the first RAN node may additionally or alternatively include in the first request a request for supplementary ML model information for an ML model executed by the second RAN node. In a further example, as illustrated at 904*d*, the first RAN node may additionally or alternatively include in the first request a request for a performance parameter of a RAN operation performed in relation to the wireless device and configured on the basis of an ML model executed by the wireless device. The first request may in some example apply to a plurality of wireless devices. A range of additional elements may be included in the first request, including for example information about start time, validity time, periodicity and initiating condition for provision of information, an identifier of one or more wireless devices that are the subject of the request, etc.

The first request, including requests for supplementary ML information, performance parameters etc., if present, may be included as Information Elements in any one of more of the messages discussed above with reference to FIGS. 5 to 8. For example, the first request could be included in a HANDOVER REQUEST ACKNOWLEDGE message 502, an SeNB ADDITION REQUEST ACKNOWLEDGE message 604, an SeNB MODIFICATION REQUEST message 702 and/or an SeNB MODIFICATION REQUIRED message 802. In another example, the requested information could be received in a HANDOVER REQUEST message 502, an SeNB ADDITION REQUEST message 602, an SeNB MODIFICATION REQUEST ACKNOWLEDGE message 704 and/or an SeNB MODIFICATION CONFIRM message 804. In another example, the information can be shared from the Access and Mobility Management functions (AMF) in New Radio (NR). For example in the INITIAL CONTEXT SETUP REQUEST or UE-CONTEXT-MODI-FICATION-REQUEST sent from the AMF to the gNB.

In some examples, the first RAN node may receive an acknowledgement of the first request (not shown), which acknowledgement may indicate what of the requested information the second RAN node can/cannot provide. The acknowledgement may for example include an identification of information relating to execution of ML models by wireless devices that the second RAN node is operable to provide, and/or an identification of information requested in the first request and that the second RAN node is unable to provide. For example, if the second RAN node is unable to provide all of the information requested by the first RAN node, the acknowledgement of the first request may include an identification or specification of the information that the second RAN node is able to provide, of the information that the second RAN node is unable to provide, of the requested information that the second RAN node is able to provide, and/or of the requested information that the second RAN node is unable to provide.

In step 910, the first RAN node receives, from the second RAN node, the requested information indicating whether the wireless device is capable of executing an ML model that is operable to provide an output on the basis of which at least one RAN operation performed by the wireless device may be configured. As illustrated, this information may be received in response to the first request sent at step 904, and/or may be provided by the second RAN node without prompting via the first request. The requested information may be received by the first RAN node in a dedicated message, or as one or more Information Elements in a message sent as part of a connection or mobility procedure performed by the wireless device. For example, the requested information could be received in a HANDOVER REQUEST message 502, an SeNB ADDITION REQUEST message 602, an SeNB MODIFICATION REQUEST ACKNOWLEDGE message 704 and/or an SeNB MODIFI-CATION CONFIRM message 804. In another example, the requested information could be received in a HANDOVER REQUEST message 502, an SeNB ADDITION REQUEST message 602, an SeNB MODIFICATION REQUEST ACKNOWLEDGE message 704 and/or an SeNB MODIFI-CATION CONFIRM message 804. In another example, the information can be shared from the Access and Mobility Management functions (AMF) in New Radio (NR). For example in the INITIAL CONTEXT SETUP REQUEST or UE-CONTEXT-MODIFICATION-REQUEST sent from the AMF to the gNB.

As illustrated at 910*a* and 910*b*, the first RAN node may receive, from the second RAN node, supplementary ML model information for an ML model executed by the wireless device and/or by the second RAN node. The first RAN node may also or alternatively receive from the second RAN node a performance parameter of a RAN operation performed in relation to the wireless device and configured on the basis of an ML model executed by the wireless device. The supplementary ML model information and performance parameter may be received in response to a specific request included in the first request sent at step 904, or may be provided by the second RAN node without prompting via a specific request. The supplementary ML model information and performance parameter may be received together with the capability information, or separately.

As illustrated at step 910, the first RAN node may, at step 910, receive from the second RAN node information indicating whether a plurality of wireless devices is capable of executing an ML model that is operable to provide an output on the basis of which at least one RAN operation performed by the wireless devices may be configured. The received information may include supplementary ML model information for the plurality of wireless devices, which information may be aggregated across the plurality of wireless devices. At least some of the information provided by the second RAN node to the first RAN node in step 910 may have been received by the second RAN node from the wireless device or devices concerned. Such information may for example have been received during execution of one or more methods as disclosed in a non-published reference document.

In some examples (not shown), the first RAN node may send an acknowledgement of receipt of the information to the second RAN node. In some examples of the present disclosure, the first RAN node may receive the requested information periodically, for example if the second RAN node updates the requested information according to a schedule, time period or a configured trigger, and sends the updated requested information to the first RAN node.

Referring now to FIG. 9*b*, the first RAN node may set a RAN parameter for the wireless device on the basis of a received performance parameter of a RAN operation in step 912. The RAN parameter may comprise any parameter relating to the performance of a RAN operation by or involving the wireless device, and/or relating to the interaction of the wireless device with the RAN. In some examples, the RAN parameter may comprise an indication for the wireless device to use a legacy method instead of an ML-based procedure. For example, the RAN parameter could configure the wireless device to measure on a secondary carrier instead of predicting the coverage using an ML model. (Secondary carrier prediction use case). In step 914, the first RAN node may update a model for execution by the wireless device in response to information received from the second RAN node. The forts RAN node may send information about the updated model to the wireless device in step 916. The updating of a model in step 914 may be performed on the basis of the information received in step 910, which may be combined with other information available to the first RAN node, including changes in the radio network environment since the model was configured, changes in the network including new RAN nodes, etc. Sending information about the updated model in step 916 may comprise sending the updated model, sending updates to the model, sending information about when the updated model should be used, etc.

In step 918, the first RAN node may configure a parameter of a RAN operation to be executed by the wireless device on the basis of the information received in step 910. For example, if the information received in step 910 indicates that the wireless device has a suitable model for predicting signal strength of beams, the first RAN node may configure a parameter of a beamforming management operation so as to transmit fewer beams to the wireless device, the wireless device being able to predict signal strength on the non-transmitted beams. In another example, if the information received in step 910 indicates that the wireless device has a suitable model for predicting coverage on a target carrier, the first RAN node may configure a parameter relating to the frequency of source carrier signalling for the wireless device, reducing the frequency of source carrier signalling to the wireless device. Other examples of configuration of RAN operation parameters on the basis of the received information may be envisaged.

It will be appreciated that the steps of the method 900 may be performed in a different order to that presented above, and may be interspersed with actions executed as part of other procedures being performed concurrently by the first RAN node.

FIG. 9*c* illustrates examples of information items that may be included in the supplementary ML model information received by the first RAN node at step 910. Referring to FIG. 9*c*, steps 921 to 927 illustrate examples of information that may be included in the supplementary ML model information that is received by the first RAN node. According to different examples of the present disclosure, the supplementary ML model information may include any combination of one, some, all or none of the information illustrated at 921 to 927. Each example of information is discussed in greater detail below.

The supplementary ML model information may comprise information 921 indicating whether the wireless device is or has been configured to execute an ML model that is operable to provide an output on the basis of which at least one RAN operation performed by the wireless device may be configured. The supplementary ML model information may further comprise information 922 indicating whether the wireless device is or has been performing a RAN operation that is configured on the basis of an output of an ML model executed by the wireless device, and/or an identification 923 of a RAN operation performed by the wireless device and that the wireless device has been configured, or is operable to configure, on the basis of an output of an ML model executed by the wireless device.

In some examples, the supplementary ML model information may comprise an identification 924, for a RAN operation, of an ML model that the wireless device is configured to execute and on the basis of which the RAN operation may be configured. The supplementary ML model information may additionally or alternatively comprise an identification 925 of information reported by the wireless device that is based on an output of an ML model executed by the wireless device.

In some examples, the supplementary ML model information may comprise information 926 about an ML model that the wireless device is or has been configured to execute, wherein the ML model is operable to provide an output on the basis of which at least one RAN operation performed by the wireless device may be configured. In further examples, the supplementary ML model information may comprise information 927 about a capability of the wireless device to execute an ML model.

The information 926 about an ML model that the wireless device is or has been configured to execute may encompass a wide range of information items, as illustrated in FIG. 9*c*. The information 926 about an ML model that the wireless device is or has been configured to execute may comprise any one or more of the following:

a model type 926*a;*
a model identifier 926*b;*
a RAN operation type which may be configured on the basis of an output of the model 926*c;*
a model configuration parameter 926*d;*
a model performance parameter 926*e;*
identification of an entity that provided a configuration parameter for the model 926*f;* identification of an entity that instructed instantiation of the model 926*g;*
a time or location in which the model was configured 926*h;*
a time or location in which the model has been executed by the wireless device 926*i;*
a default configuration of the model 926*j;*
a capability of the wireless device to train the model 926*k;*
an indication of training of the model performed by the wireless device 926*l.*

The information 927 about a capability of the wireless device to execute an ML model may comprise any one or more of the following:

Wireless device manufacturer/model etc.
Maximum consumed memory of model that can be supported.
Floating point support, for example 8-bit/16-bit/32-bit float.
Wireless device computational capabilities, for example in terms of number of operations per second, type of processor (CPU, GPU), number of CPUs etc. This could be reported specifically for executing an ML model or more generally associated to the wireless device.
Type of models supported, for example decision tree, decision forest, linear regression, feedforward neural network, recurrent neural network, convolutional neural network, etc.
Maximum supported computational cost/load for executing a model. This could be expressed, for example, in terms of a number of operations and their type that the wireless device can perform for executing a model. The maximum supported computational cost/load can also be associated to a particular type of model. Therefore, for each model supported by the UE, the UE could report a maximum supported computational cost for executing a model. This may enable a RAN node to select the most appropriate model (type, dimension, etc.) for a specific UE based on the UE capabilities.

In some examples, the capabilities may include an indication about the number of different ML models with which the wireless device can be configured simultaneously. For example, the wireless device could indicate that it can be configured with at most three decision trees and two Neural Networks simultaneously, or with 4 Neural Networks simultaneously etc. This capability may be based on the wireless device's hardware and software limitations.

Figure 10:
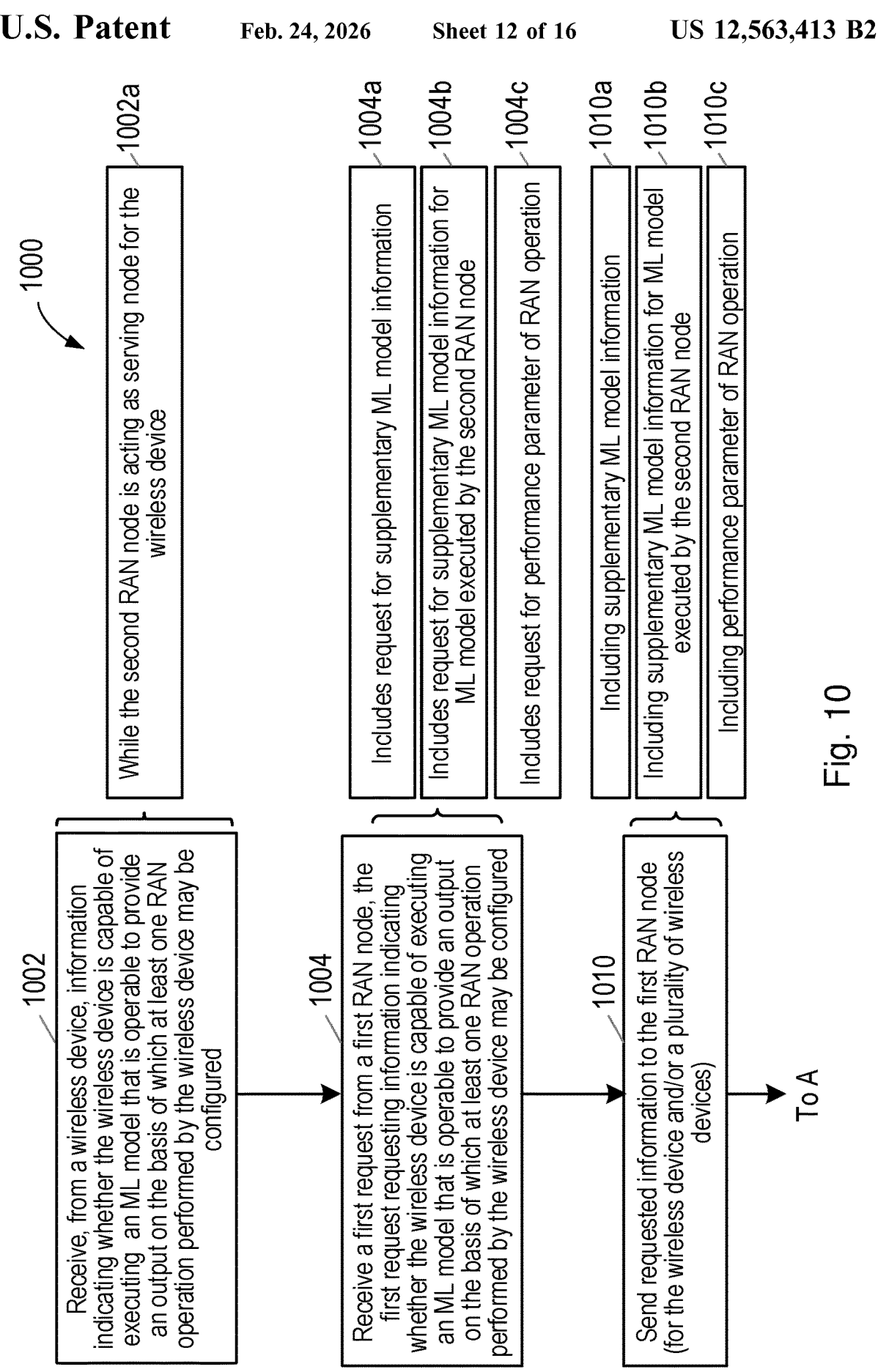
FIG. 10 is a flow chart illustrating process steps in another example of a method performed by a second RAN node for managing a wireless device.

The method 900 may be complemented by a method 1000 performed by a second RAN node. FIG. 10 shows a flow chart illustrating process steps in another example of method 1000 for managing a wireless device that is operable to connect to a communication network, wherein the communication network comprises a RAN. The method 1000 provides various examples of how the steps of the method 200 may be implemented and supplemented to achieve the above discussed and additional functionality. The method 1000 is performed by the second RAN node. The second RAN node may have acted as a serving node for the wireless device. The second RAN node may for example be the last serving node of the wireless device before a previous disconnection from the network, for example in the context of a connection request. In another example, the second RAN node may be the current serving node of the wireless device, with the UE camping in the coverage area of cells controlled by the second RAN node.

Referring to FIG. 10, in step 1002, the second RAN node may receive, from the wireless device, information indicating whether the wireless device is capable of executing an ML model that is operable to provide an output on the basis of which at least one RAN operation performed by the wireless device may be configured. The second RAN node may additionally receive supplementary ML model information from the wireless device, or from a plurality of wireless devices. The second RAN node may aggregate information received from the plurality of wireless devices. As illustrated at 1002a, the second RAN node may receive this information while acting as a serving node for the wireless device or devices. The information may be received from the wireless device or devices in step 1002 as part of execution of a method as disclosed in a non-published reference document.

In step 1004, the second RAN node may receive a first request from a first RAN node of the communication network, the first request requesting information indicating whether the wireless device is capable of executing an ML model that is operable to provide an output on the basis of which at least one RAN operation performed by the wireless device may be configured. As illustrated at 1004a, the first request may include a request for supplementary ML model information for an ML model operable for execution by the wireless device. The ML model may be an ML model that the wireless device is configured to execute, can be configured to execute, has executed in the past, etc. Supplementary ML model information is discussed in detail above with reference to FIG. 9c, and this discussion is not repeated here. In a further example, as illustrated at 1004b, the first request may additionally or alternatively include a request for supplementary ML model information for an ML model executed by the second RAN node. In a further example, as illustrated at 1004c, the first request may additionally or alternatively include a request for a performance parameter of a RAN operation performed in relation to the wireless device and configured on the basis of an ML model executed by the wireless device. The first request may in some examples apply to a plurality of wireless devices. A range of additional elements may be included in the first request, including for example information about start time, validity time, periodicity and initiating condition for provision of information, an identifier of one or more wireless devices that are the subject of the request, etc.

The first request, including requests for supplementary ML information, performance parameters etc., if present, may be included as Information Elements in any one of more of the messages discussed above with reference to FIGS. 5 to 8. For example, the first request could be included in a HANDOVER REQUEST ACKNOWLEDGE message 502, an SeNB ADDITION REQUEST ACKNOWLEDGE message 604, an SeNB MODIFICATION REQUEST message 702 and/or an SeNB MODIFICATION REQUIRED message 802. In another example, the requested information could be received in a HANDOVER REQUEST message 502, an SeNB ADDITION REQUEST message 602, an SeNB MODIFICATION REQUEST ACKNOWLEDGE message 704 and/or an SeNB MODIFICATION CONFIRM message 804. In another example, the information can be shared from the Access and Mobility Management functions (AMF) in New Radio (NR). For example in the INITIAL CONTEXT SETUP REQUEST or UE-CONTEXT-MODIFICATION-REQUEST sent from the AMF to the gNB.

In some examples, the second RAN node may determine what of the requested information the second RAN node is capable of providing (not shown), and send an acknowledgement of the first request (not shown), which acknowledgement may indicate what of the requested information the second RAN node can/cannot provide. The acknowledgement may for example include an identification of information relating to execution of ML models by wireless devices that the second RAN node is operable to provide, and/or an identification of information requested in the first request and that the second RAN node is unable to provide. For example, if the second RAN node is unable to provide all of the information requested by the first RAN node, the acknowledgement of the first request may include an identification or specification of the information that the second RAN node is able to provide, of the information that the second RAN node is unable to provide, of the requested information that the second RAN node is able to provide, and/or of the requested information that the second RAN node is unable to provide.

In step 1010, the second RAN node sends, to the first RAN node, the requested information indicating whether the wireless device is capable of executing an ML model that is operable to provide an output on the basis of which at least one RAN operation performed by the wireless device may be configured. As illustrated, this information may be sent in response to the first request received at step 1004, and/or may be provided by the second RAN node without prompting via the first request, for example as part of standardised behaviour for one or more connection and/or mobility procedures. The information may be sent by the second RAN node in a dedicated message, or as one or more Information Elements in a message sent as part of a connection or mobility procedure performed by the wireless device. For example, the information could be sent in a HANDOVER REQUEST message 502, an SeNB ADDITION REQUEST message 602, an SeNB MODIFICATION REQUEST ACKNOWLEDGE message 704 and/or an SeNB MODIFICATION CONFIRM message 804. In another example, the requested information could be received in a HANDOVER REQUEST message 502, an SeNB ADDITION REQUEST message 602, an SeNB MODIFICATION REQUEST ACKNOWLEDGE message 704 and/or an SeNB MODIFICATION CONFIRM message 804. In another example, the information can be shared from the Access and Mobility Management functions (AMF) in New Radio (NR). For example in the INITIAL CONTEXT SETUP REQUEST or UE-CONTEXT-MODIFICATION-REQUEST sent from the AMF to the gNB.

As illustrated at 1010a and 1010b, the second RAN node may send, to the first RAN node, supplementary ML model information for an ML model executed by the wireless device and/or by the second RAN node. The second RAN node may also or alternatively send to the first RAN node a performance parameter of a RAN operation performed in relation to the wireless device and configured on the basis of an ML model executed by the wireless device. The supplementary ML model information and performance parameter may be sent in response to a specific request included in the first request received at step 1004, or may be provided by the second RAN node without prompting via a specific request. The supplementary ML model information and performance parameter may be sent together with the capability information, or separately.

As illustrated at step 1010, the second RAN node may, at step 1010, send to the first RAN node information indicating whether a plurality of wireless devices is capable of executing an ML model that is operable to provide an output on the basis of which at least one RAN operation performed by the wireless devices may be configured. The sent information may include supplementary ML model information for the plurality of wireless devices, which information may be aggregated across the plurality of wireless devices. At least some of the information provided by the second RAN node to the first RAN node in step 1010 may have been received by the second RAN node from the wireless device or devices concerned in step 1002.

In some examples (not shown), the second RAN node may receive an acknowledgement of receipt of the information from the first RAN node. In some examples of the present disclosure, the second RAN node may send the requested information periodically, for example updating the requested information according to a schedule, time period or a configured trigger, and sending the updated requested information to the first RAN node.

It will be appreciated that, as for the method 900 discussed above, the steps of the method 1000 may be performed in a different order to that presented above, and may be interspersed with actions executed as part of other procedures being performed concurrently by the wireless device. It will also be appreciated that in some examples of the present disclosure, a single RAN node may act as a first and as a second RAN node, in respect of different wireless devices, or in respect of the same wireless device at different times. For example a RAN node may request and receive information for a wireless device that is a candidate for handover to the RAN node (so performing a method 100 or 900 as a first RAN node), and may receive a request and send information for a different wireless device that is a candidate for handover from the RAN node (so performing a method 200 or 1000 as a second RAN node).

The methods 100, 200, 900 and 1000 illustrate how first and second RAN nodes may cooperate to support the implementation and orchestration of ML models executed by a wireless device in support of RAN operations.

There now follows a discussion of a range of different implementation detail that may be encompassed within the methods disclosed herein. The detail presented below encompasses how the information exchanged according to the above methods may be incorporated into existing signalling protocols, examples of the specific information that may be exchanged, and further discussion of example use cases and deployment scenarios for the methods of the present disclosure.

Figure 11:
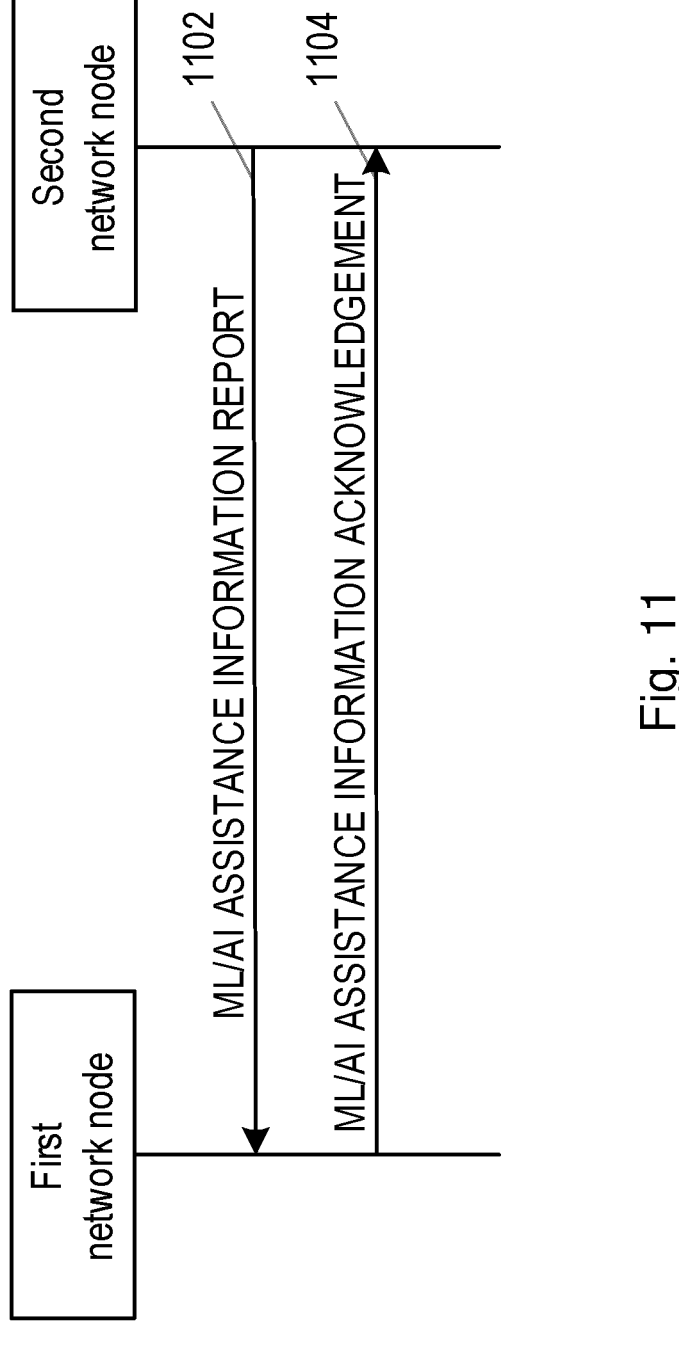
FIG. 11 is a signalling diagram illustrating an example signalling exchange.

FIG. 11 is a signalling diagram illustrating an example signalling exchange that may take place during the performance of the methods 100, 200, 900 and/or 1000. Referring to FIG. 11, in a first step 1102, a first RAN nodes receives, from a second RAN node, a signal for an ML/AI assistance information procedure between the first and second RAN nodes, the signal comprising an ML/AI assistance information report RESPONSE/UPDATE message comprising an ML/AI assistance information report that is associated with one or more wireless devices served by the second node. The ML/AI assistance information report comprises the information received in step 110 of the above discussed method 100. The first RAN node may have initially transmitted to the second RAN node an ML/AI assistance information report REQUEST message before the receipt of the report, and may also or alternatively transmit an ML/AI assistance information ACKNOWLEDGEMENT 1104 associated with one or more wireless devices served by the second RAN node.

In some examples, the second RAN node may proactively transmit to the first network an ML/AI assistance information REPORT associated with one or more wireless devices served by the second RAN node. In other examples, the first RAN node may initiate an ML/AI assistance information procedure using an ML/AI assistance information report REQUEST associated with one or more wireless devices served by the second RAN node. An ML/AI information request from the first node to the second node may be triggered for example at connection setup or based on the radio network operation for one or more devices served by the second node and/or first node. The first node may additionally request and receive performance information for one or more radio network operations performed by a UE using AI/ML, and may use the performance information to set control parameters related to the UE in the first node.

According to different implementations of methods disclosed herein, existing standardised procedures, such as handover, Secondary node change in Dual Connectivity etc., may be update to include exchange of ML related information such that methods according to the present disclosure are carried out at part of the updated procedures.

Implementations Related to Reception of ML/AI Assistance Information Report

Starting an ML/AI Assistance Information Procedure

Figure 12:
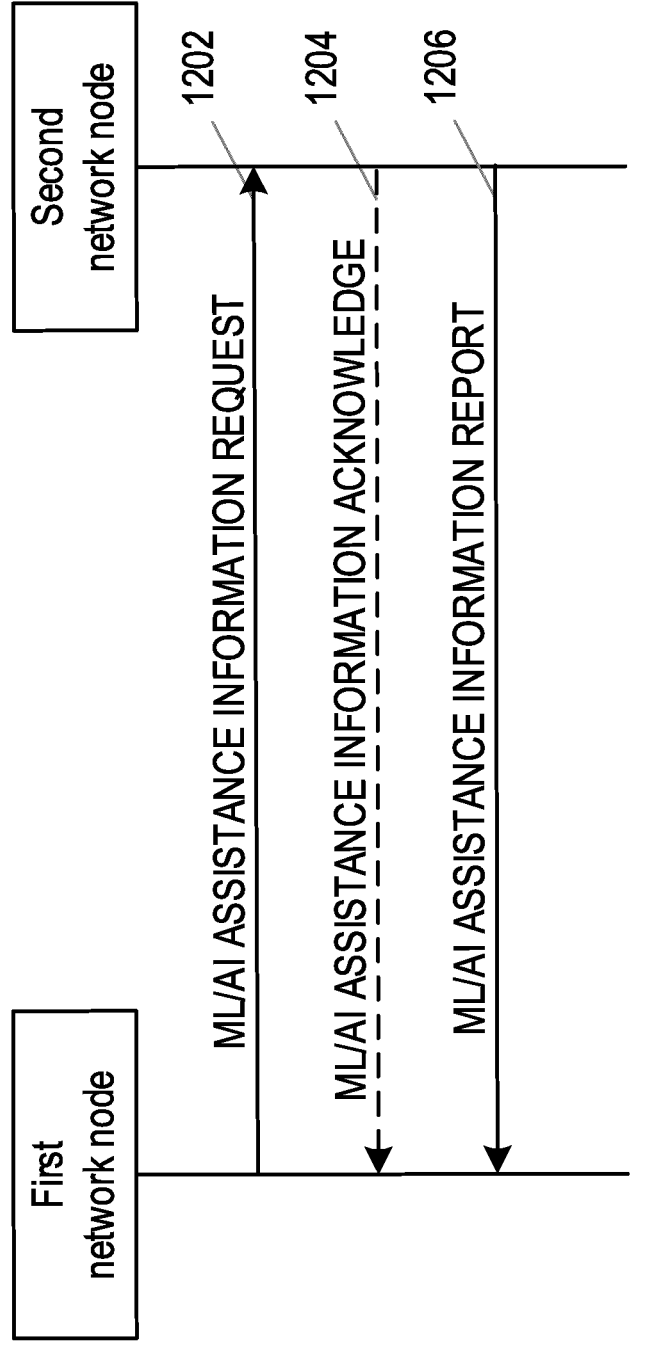
FIG. 12 is a signalling diagram illustrating another example signalling exchange.

In one example of the present disclosure, illustrated in FIG. 12, the first RAN node may transmit, to a second RAN node, an ML/AI assistance information REQUEST. The first RAN node then receives from the second RAN node, an ML/AI assistance information report. The request message thus starts an ML/AI assistance information procedure between the first and second RAN nodes Triggering an ML/AI Assistance Information REQUEST In one example, a request for ML/AI information may be triggered whenever a UE connects to a communication network. At connection setup, the network can receive a list of radio access nodes (RAN nodes, such as an eNB, gNb etc.) that have served the UE. The list of previous serving nodes can be reported from the UE, or from a core RAN node such as a Mobility Management Entity (MME), a Packet Data Network Gateway (P-GW), a Service Capability Exposure Function (SCEF) or other suitable logical of functional entity in or in communication with the network. The first node can then request an AI/ML assistance report from one or more nodes that have previously served the UE. In another example, the AI/ML information can be located in, and requested from, a core node.

In a further example, a request for ML/AI information may be triggered by a triggering criterion for one or more UE radio network operations. This enables the first node to request AI/ML information whenever UE performance related to one or more radio network operations degrades. Such degradation could for example include UE reported measurements on a carrier other than its serving carrier failing to match the expected measurements for the carrier. Another example of performance degradation includes UE beamforming gain that fails to match the beamforming gain of other UEs served by the first node. This could arise if for example the UE is reporting inaccurate reference signal measurements generated by an outdated or invalid ML model.

ML/AI Assistance Information REQUEST

In one example of the present disclosure, the ML/AI assistance information REQUEST may comprise a list of one or more one or more ML/AI assistance information elements, requested by the first RAN node from the second RAN node. The requested ML/AI assistance information elements may be related to the use or configuration of ML/AI models and algorithms for wireless devices served by the second RAN node (that is, wireless devices camping in the coverage area of radio cells controlled by the second RAN node), or be related to the use or configuration of ML/AI models and algorithms at the second RAN node. Examples of such information elements are discussed below.

The requested information may include measurements and reports transmitted by wireless devices to the second RAN node which have been created (fully or in part) based on ML/AI models or algorithms executed by the wireless device. The requested information may comprise an aggregated set of measurements, and provide a statistical representation of the measurements, so reducing reporting size. Methods for how to represent the measurements/accuracies can be included in the REQUEST. For example the request may include an indication or instruction to apply Gaussian approximation to the set of measurements. Methods for representing measurements could also include more complex methods such as variational autoencoders, where the second node reports the parameters needed to reconstruct the measurements (latent space/decoder information).

Another example of information that may be requested and provided to the first RAN node is the performance of a radio operation which operates (fully or in part) based on ML/AI models. The performance can comprise of the accuracy of relevant measurements. The performance could also comprise a statistical representation of overall accuracy. The first node can use the received performance information to set parameters related to the UE. For example, if the UE reports accurate secondary frequency measurements, the first RAN node can request such measurements more frequently and provide a better carrier selection for said UE.

A selection of what assistance information to REQUEST can also be based on UE performance of the radio operations in the first node. For example the first node may request assistance information related to radio network operations involving the UE that are performing unexpectedly.

The ML/AI assistance information REQUEST may also include one or more configuration information elements, such as:

A starting time for reporting ML/AI assistance information

A validity time and/or a time window for reporting ML/AI assistance information

A periodicity for reporting ML/AI assistance information.

A repetition pattern for reporting ML/AI assistance information, for example with a reporting gap between periods in which ML/AI assistance information is reported.

One or more performance criteria or conditions that the second RAN node can use to initiate the transmission of ML/AI assistance information reporting. For instance, the identification of a wireless device served by the second RAN node, which uses or can be configured to use ML/AI models or algorithms for executing one or more network operations.

An identifier for one or more cells of the second RAN node to which the ML/AI assistance information REQUEST applies, such as the physical cell identity (PCI) or other type of identifiers.

An identifier for one or more wireless devices served by the second RAN node to which the ML/AI assistance information REQUEST applies, such as a global user identity or types of user identity.

As discussed above, the first RAN node may receive an ML/AI assistance information ACKNOWLEDGE message from the second RAN node. The ACKNOWLEDGE message may include any combination of one or more of the following information elements:

A positive acknowledgement (ACK) corresponding to one or more ML/AI assistance information elements requested by the first RAN node in the ML/AI assistance information REQUEST message;

A negative acknowledgement (NACK) corresponding to one or more ML/AI assistance information elements requested by the first RAN node in the ML/AI assistance information REQUEST message;

A list of one or more one or more ML/AI assistance information elements, requested by the first RAN node in the ML/AI assistance information REQUEST message, that the second RAN node is capable of providing;

A list of one or more one or more ML/AI assistance information elements, requested by the first RAN node in the ML/AI assistance information REQUEST message, that the second RAN node is not capable to provide.

The second RAN node may determine what information to include in the acknowledgement message on the basis of the received request message and the relevant information available to the second RAN node.

In the event of a successful initialisation of an ML/AI assistance information procedure, the second RAN node generates and provides an ML/AI assistance information report, and examples of information elements that may be included in the report are discussed both above, with reference to FIGS. 1, 2, 9a to 9c and 10, and below. The ML/AI assistance information report may also include measurements and reports transmitted by wireless devices to the second RAN node which have been created (fully or in part) based on ML/AI models or algorithms executed by the wireless device.

Implementations Related to Contents of the ML/AI Assistance Information Report

As discussed above, the ML/AI assistance information report for mobility/connectivity operations between the first and the second RAN node may comprise any combination of one or more of the following information elements:

An indication of whether a wireless device is capable of executing ML models or algorithms An indication of whether the wireless device is configured to execute ML models or algorithms for radio networking operations An indication of whether the wireless device is currently executing ML models or algorithms for radio networking operations A list of radio networking operations that a wireless device is capable of performing, configured to perform or currently performing based on ML models or algorithms.

An indication of whether and which wireless device reports comprise information generated with an ML model or algorithm.

An indication of which information element(s) within a wireless device report are generated based on an ML model or algorithm Information associated to the machine learning models or algorithms used by the wireless device (see below for details).

Examples of operations executed by the wireless device with a machine learning model may comprise one or more operations in the group of:

power control in Uplink (UL) transmission timing advance in UL transmission

Link adaptation in UL transmission, such as selection of modulation and coding scheme Estimation of channel quality or other performance metrics, such as radio channel estimation in uplink and downlink,
channel quality indicator (CQI) estimation/selection,
signal to noise estimation for uplink and downlink,
signal to noise and interference estimation,
reference signal received power (RSRP) estimation,
reference signal received quality (RSRQ) estimation,
etc.

Information compression for UL transmission

Coverage estimation for secondary carrier

Estimation of signal quality/strength degradation

Mobility related operations, such as cell reselection and handover trigger

Energy saving operations

Positioning using ML methods, for example a model that translates radio measurements into a geographical location Compression of radio measurements, such as efficient channel state information reporting, used to improve beamforming operations or positioning estimation Examples of wireless device reports that may include an identification of ML based information include reports associated with radio resource management, wireless device measurement, mobility operations (for example handover reports, link failure reports, etc.), random access operation (for example RACH reports), multi-connectivity operation, beamforming operations, RRC state handling, traffic control, energy efficiency operations, etc.

Examples of information associated to the machine learning models and algorithms used by the wireless device that may be sent by the second RAN node to the first RAN node may include:

The type of ML model or algorithm used by the wireless device;

A unique identifier of the model, which may be used by the RAN node to derive information on when, where and how the model was generated. The model-ID could also indicate the operator or network vendor that generated the model.

The type of networking operation served by the ML model or algorithm

Information associated to the ML model or algorithm configuration parameters, and/or how and when the parameters were configured.

Measured or estimated ML model/algorithm performance, for instance in terms of accuracy or precision. This could be represented with average values over a certain interval of time, standard deviation, maximum or minimum value, etc.

Information about which RAN node or radio cell has instantiated, configured or modified the configuration and use of the ML model/algorithm for the wireless device, such as the cell ID, the type of cell, the type of transmission model used in the cell, etc.

Information about when the model was instantiated

Information about when and in what radio cells the model has been used

Information about the default configuration of the ML model and algorithm used by the wireless device Information about which network operator has instantiated, configured or modified the configuration of the ML model/algorithm.

An indication of whether the wireless device has training capability

An indication of whether and/or when the wireless device has trained, retrained or updated a machine learning model. In this case, the information associated with the machine learning models used by the wireless device may further include information associated with training.

An indication of when and in what radio-nodes the wireless device has previously used an ML model Implementations Related to Transmission of ML/AI Assistance Information Report The ML/AI assistance information REPORT transmitted by the second RAN node to the first RAN node may be used for or associated to one or more operations involving mobility of one or more wireless devices between the coverage area of radio cells controlled by the second RAN node and radio cells controlled by the first RAN node. Such operations may include, for example, intra- and inter-frequency handover, handover for to mobility load balance, load sharing and load optimization, dual connectivity, coordinated multi-point transmission and reception, etc.

As discussed above, the second RAN node may receive, from a wireless device, a wireless device specific ML/AI assistance information report comprising information relating to whether a wireless device is capable or configured to use ML models/algorithms. The second RAN node may therefore generate the ML/AI assistance information report for sending to the first node based on one or more wireless device specific ML/AI assistance information reports received from one or more wireless devices. In one example, the ML/AI assistance information exchanged between the second RAN node and the first RAN node may comprise an indication of the identity of one or more wireless devices to which the ML/AI assistance information report applies. This will enable the first and second RAN nodes to optimise mobility operations relating to wireless devices moving between the coverage area of radio cells controlled by the two RAN nodes, as well as to optimise other operations between the two RAN nodes such as load balance and load sharing, multi-connectivity (e.g., dual connectivity), coordinated multi-point transmission/reception, etc.

Transmitting the ML/AI Assistance Information Report within Existing Procedures

The second RAN node may transmit to the first RAN node an ML/AI assistance information report relating to one or more wireless devices as part of the initialisation signalling of any one or more of the following operations:

Mobility handover (intra- or inter-frequency, intra- or inter-radio access technology (RAT))

Multi-connectivity, such as dual connectivity, (intra- or inter-frequency, intra- or inter-RAT)

Load balancing and load sharing (intra- or inter-frequency, intra- or inter-RAT)

Inter-RAT interoperability

Coordination for transmission and/or reception from wireless devices, such as coordinated multi-point (CoMP) transmission/reception to/from wireless devices For example, the second RAN node may transmit the ML/AI assistance information report relating to one or more wireless devices to the first RAN node during a handover preparation procedure as part of the HANDOVER REQUEST message defined by the 3GPP TS 36.423 for LTE and 3GPP TS 38.423 for NR. In another example, the second RAN node may transmit the ML/AI assistance information report relating to one or more wireless devices to the first RAN node during a secondary RAN node addition procedure as part of the SENB/SGNB ADDITION REQUEST for dual connectivity operation in LTE or in NR, respectively. In another example, the second RAN node may transmit the ML/AI assistance information report relating to one or more wireless devices to the first RAN node during a secondary RAN node modification procedure as part of the SENB/SGNB MODIFICATION REQUEST for dual connectivity operation in LTE or in NR, respectively.

Transmission of the ML/AI assistance information report during other procedures may be envisaged. One advantage of such implementation is that the second RAN node pro-actively transmits the ML/AI assistance information report during the initialization phase of existing inter-node proce-dures, thereby saving inter-node signalling overhead and reducing latency.

As discussed in the present disclosure, the methods 100, 900 are performed by a first RAN node, and the methods 200, 1000 are performed by a second RAN node. The present disclosure provides first and second RAN nodes that are adapted to perform any or all of the steps of the above discussed methods.

Figure 13:
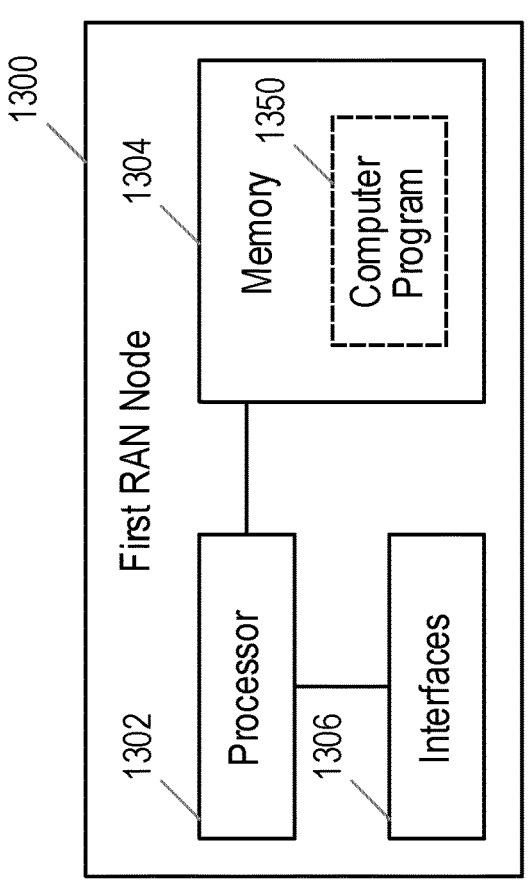
FIG. 13 is a block diagram illustrating functional modules in a first RAN node.

FIG. 13 is a block diagram illustrating an example first RAN node 1300 which may implement the method 100 and/or 900 according to examples of the present disclosure, for example on receipt of suitable instructions from a computer program 1350. Referring to FIG. 13, the first RAN node 1300 comprises a processor or processing circuitry 1302, and may comprise a memory 1304 and interfaces 1306. The processing circuitry 1302 is operable to perform some or all of the steps of the method 100 and/or 900 as discussed above with reference to FIGS. 1 and 9a to 9c. The memory 1304 may contain instructions executable by the processing circuitry 1302 such that the first RAN node 1300 is operable to perform some or all of the steps of the method 100 and/or 900. The instructions may also include instruc-tions for executing one or more telecommunications and/or data communications protocols. The instructions may be stored in the form of the computer program 1350. In some examples, the processor or processing circuitry 1302 may include one or more microprocessors or microcontrollers, as well as other digital hardware, which may include digital signal processors (DSPs), special-purpose digital logic, etc. The processor or processing circuitry 1302 may be imple-mented by any type of integrated circuit, such as an Appli-cation Specific Integrated Circuit (ASIC), Field Program-mable Gate Array (FPGA) etc. The memory 1304 may include one or several types of memory suitable for the processor, such as read-only memory (ROM), random-access memory, cache memory, flash memory devices, opti-cal storage devices, solid state disk, hard disk drive etc.

Figure 14:
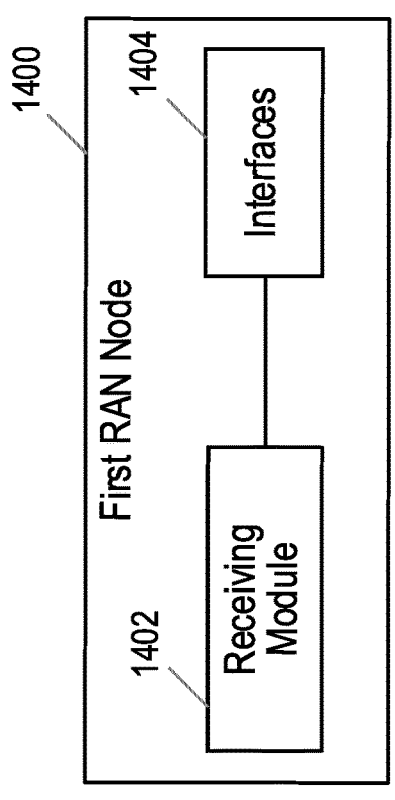
FIG. 14 is a block diagram illustrating functional modules in another example of a first RAN node.

FIG. 14 illustrates functional modules in another example of first RAN node 1400 which may execute examples of the methods 100 and/or 900 of the present disclosure, for example according to computer readable instructions received from a computer program. It will be understood that the modules illustrated in FIG. 14 are functional mod-ules, and may be realised in any appropriate combination of hardware and/or software. The modules may comprise one or more processors and may be integrated to any degree.

Referring to FIG. 14, the first RAN node 1400 is for managing a wireless device that is operable to connect to the communication network of which the first RAN node is a part. The first RAN node comprises a receiving module 1402 for receiving, from a second RAN node in the communica-tion network, information indicating whether a wireless device is capable of executing an ML model that is operable to provide an output on the basis of which at least one RAN operation performed by the wireless device may be config-ured. The first RAN node may further comprise interfaces 1404.

Figure 15:
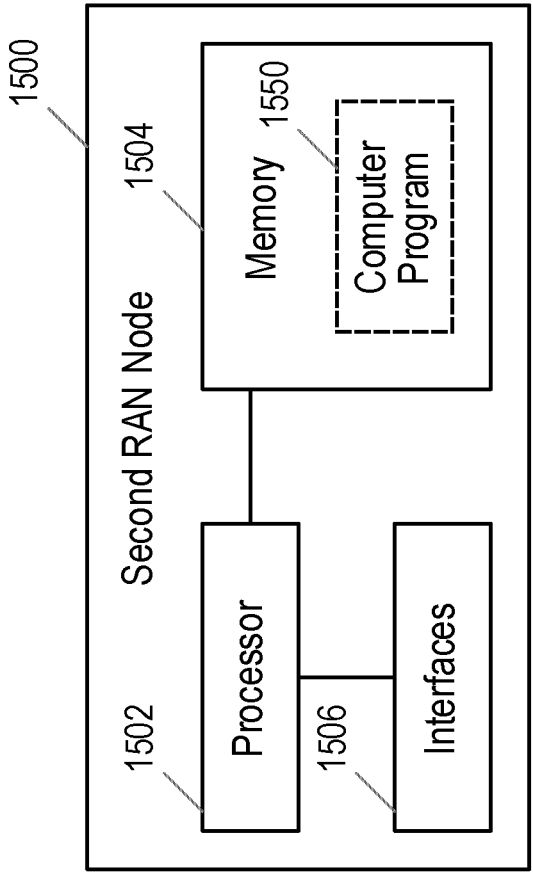
FIG. 15 is a block diagram illustrating functional modules in a second RAN node.

FIG. 15 is a block diagram illustrating an example second RAN node 1500 which may implement the method 200 and/or 1000 according to examples of the present disclosure, for example on receipt of suitable instructions from a computer program 1550. Referring to FIG. 15, the second RAN node 1500 comprises a processor or processing cir-cuitry 1502, and may comprise a memory 1504 and inter-faces 1506. The processing circuitry 1502 is operable to perform some or all of the steps of the method 200 and/or 1000 as discussed above with reference to FIGS. 2 and 10. The memory 1504 may contain instructions executable by the processing circuitry 1502 such that the second RAN node 1500 is operable to perform some or all of the steps of the method 200 and/or 1000. The instructions may also include instructions for executing one or more telecommu-nications and/or data communications protocols. The instructions may be stored in the form of the computer program 1550. In some examples, the processor or process-ing circuitry 1502 may include one or more microprocessors or microcontrollers, as well as other digital hardware, which may include digital signal processors (DSPs), special-pur-pose digital logic, etc. The processor or processing circuitry 1502 may be implemented by any type of integrated circuit, such as an Application Specific Integrated Circuit (ASIC), Field Programmable Gate Array (FPGA) etc. The memory 1504 may include one or several types of memory suitable for the processor, such as read-only memory (ROM), ran-dom-access memory, cache memory, flash memory devices, optical storage devices, solid state disk, hard disk drive etc.

Figure 16:
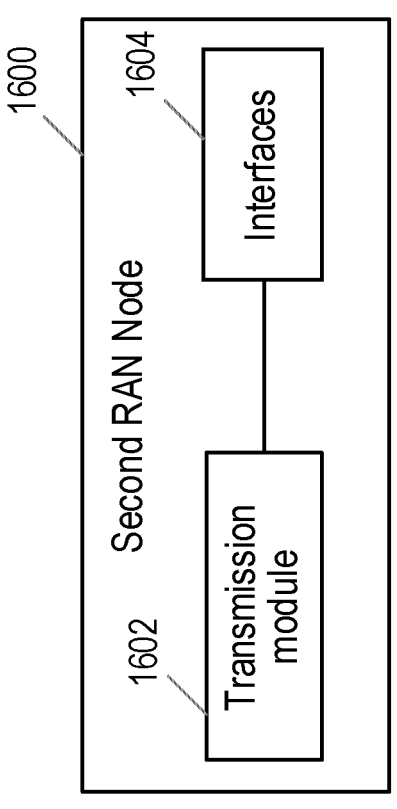
FIG. 16 is a block diagram illustrating functional modules in another example of a second RAN node.

FIG. 16 illustrates functional modules in another example of second RAN node 1600 which may execute examples of the methods 200 and/or 1000 of the present disclosure, for example according to computer readable instructions received from a computer program. It will be understood that the modules illustrated in FIG. 16 are functional mod-ules, and may be realised in any appropriate combination of hardware and/or software. The modules may comprise one or more processors and may be integrated to any degree.

Referring to FIG. 16, the second RAN node 1600 is operable to connect to a communication network, wherein the communication network comprises a RAN. The second RAN node 1600 comprises a sending module 1602 for sending, to a first RAN node of the communication network, information indicating whether a wireless device is capable of executing an ML model that is operable to provide an output on the basis of which at least one RAN operation performed by the wireless device may be configured. The second RAN node 1600 may further comprise interfaces 1204.

Aspects of the present disclosure, as demonstrated by the above discussion, provide methods and first and second RAN nodes that cooperate to enable RAN nodes to request and exchange information about whether and which wireless devices under their radio coverage use ML models/algo-rithms to execute one or more of the wireless device operations within the radio network. Exchanging this infor-mation between RAN nodes avoids the signalling overhead over the radio interface that would be generated by gathering such information directly from the wireless device(s), for instance during a Handover procedure. System spectral efficiency is therefore improved. When radio operations produce reports for the radio network, it is beneficial for the network nodes to know how such reports have been pro-duced by the wireless device. This allows a RAN node to distinguish between information reported by the wireless device based on radio measurements, and information reported based on an ML model/algorithm. For example, if a wireless device report contains information about coverage estimated for a radio cell or a frequency band, it is beneficial to distinguish which wireless devices determine coverage based on measurements taken on reference signals and which wireless devices estimate coverage based on an ML model/algorithm.

Example methods and nodes according to the resent disclosure can improve radio network operation in a range of different ways. For example, control signalling overhead over the radio air interface may be reduced, owing to the possibility of gathering information, at multiple RAN nodes, related to the use and configuration of ML models and algorithms executed by wireless devices for radio network operations without requesting such information directly from the wireless devices as they through radio coverage areas provided by different RAN nodes. In some examples, a RAN node may be able to distinguish between information reported by a wireless device on the basis of radio measurements and information reported by the wireless device on the basis of ML models/algorithms, for wireless devices moving under the coverage area of radio cells controlled by the RAN node without requesting and receiving such information directly from the wireless device over the air interface. A RAN node may similarly distinguish between wireless devices capable or incapable of executing ML models/ algorithms, as well as identifying for which operations the wireless devices moving under the coverage area of radio cells controlled by the RAN node can execute ML models, again without requesting and receiving such information directly from the wireless device over the air interface.

In further examples, a RAN node may be able to verify whether the ML model used by a wireless device is valid for radio network operations when a wireless device enters the coverage area of a radio cell controlled by the RAN node, without requesting and receiving such information directly from the wireless device over the air interface. A model may become invalid owing to network changes that are unknown to the device (new base stations, new antenna-tilt settings, new bandwidth, new frequencies, etc.) and the network can consequently update the model(s) based on information received from the second RAN node. A RAN node may also or alternatively be able to assess the performance of ML assisted radio network operations in respect of a UE served by a second node, and may configure one or more radio parameters related to the UE when served by the first node as a consequence of that assessment.

It will be appreciated that examples of the present disclosure may be virtualised, such that the methods and processes described herein may be run in a cloud environment.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for managing a wireless device that is operable to connect to a communication network, wherein the communication network comprises a Radio Access Network (RAN), the method, performed by a first RAN node of the communication network, comprising:

receiving, from a second RAN node in the communication network, information indicating whether a wireless device is capable of executing a Machine Learning (ML) model that is operable to provide an output on the basis of which at least one RAN operation performed by the wireless device may be configured, wherein receiving the information indicating whether the wireless device is capable of executing the ML model comprises receiving the information in a response to a first request.

2. The method as claimed in claim 1, wherein the wireless device is a candidate for at least one of:

connection to the communication network;

a mobility related procedure involving the first RAN node.

3. The method as claimed in claim 2, wherein the mobility related procedure comprises at least one of:

a Handover procedure;

a multi-connectivity procedure;

a load balancing procedure;

a Radio Access Technology inter-operability procedure;

a Coordinated MultiPoint (COMP) procedure.

4. The method as claimed in claim 1, further comprising receiving, from the second RAN node, supplementary ML model information, the supplementary ML model information comprising at least one of:

information indicating whether the wireless device is or has been configured to execute an ML model that is operable to provide an output on the basis of which at least one RAN operation performed by the wireless device may be configured;

information indicating whether the wireless device is or has been performing a RAN operation that is configured on the basis of an output of an ML model executed by the wireless device;

an identification of a RAN operation performed by the wireless device and that the wireless device has configured, or is operable to configure, on the basis of an output of an ML model executed by the wireless device;

an identification, for a RAN operation, of an ML model that the wireless device is configured to execute and on the basis of which the RAN operation may be configured;

an identification of information reported by the wireless device that is based on an output of an ML model executed by the wireless device;

information about an ML model that the wireless device is or has been configured to execute, wherein the ML model is operable to provide an output on the basis of which at least one RAN operation performed by the wireless device may be configured;

information about a capability of the wireless device to execute an ML model.

5. The method as claimed in claim 1, further comprising:

sending the first request to the second RAN node, the first request requesting information indicating whether a wireless device is capable of executing an ML model that is operable to provide an output on the basis of which at least one RAN operation performed by the wireless device may be configured.

6. The method as claimed in claim 5, further comprising: including in the first request a request for supplementary ML model information.

7. The method as claimed in claim 5, further comprising: including in the first request a request for supplementary ML model information, for an ML model executed by the second RAN node; and
receiving the requested supplementary ML model information from the second RAN node.

8. The method as claimed in claim 5, further comprising: including in the first request a request for a performance parameter of a RAN operation performed in relation to the wireless device and configured on the basis of an ML model executed by the wireless device; and
receiving the requested performance parameter from the second RAN node.

9. The method as claimed in claim 1, further comprising: receiving, from the second RAN node, information indicating whether a plurality of wireless devices is capable of executing an ML model that is operable to provide an output on the basis of which at least one RAN operation performed by the wireless devices may be configured.

10. The method as claimed in claim 5, further comprising: sending the request for information to the second RAN node on occurrence of a trigger condition, wherein the trigger condition comprises at least one of:
a request from the wireless device to connect to the network;
a performance parameter for a RAN operation performed in relation to the wireless device falling below a threshold.

11. The method as claimed in claim 5, further comprising: receiving, from the second RAN node, an acknowledgement of the first request.

12. The method as claimed in claim 11, wherein the acknowledgement of the first request comprises at least one of:
an identification of information relating to execution of ML models by wireless devices that the second RAN node is operable to provide;
an identification of information requested in the first request and that the second RAN node is unable to provide.

13. A method for managing a wireless device that is operable to connect to a communication network, wherein the communication network comprises a Radio Access Network (RAN), the method, performed by a second RAN node of the communication network, comprising:
sending, to a first RAN node in the communication network, information indicating whether a wireless device is capable of executing a Machine Learning (ML) model that is operable to provide an output on the basis of which at least one RAN operation performed by the wireless device may be configured, wherein sending the information indicating whether the wireless device is capable of executing the ML model comprises sending the information in a response to a first request.

14. The method as claimed in claim 13, wherein the wireless device is a candidate for at least one of:
connection to the communication network;
a mobility related procedure involving the first RAN node.

15. The method as claimed in claim 14, wherein the mobility related procedure comprises at least one of:
a Handover procedure;
a multi-connectivity procedure;
a load balancing procedure;
a Radio Access Technology inter-operability procedure;
a Coordinated MultiPoint (COMP) procedure.

16. The method as claimed in claim 13, further comprising sending, to the first RAN node, supplementary ML model information, the supplementary ML model information comprising at least one of:
information indicating whether the wireless device is or has been configured to execute an ML model that is operable to provide an output on the basis of which at least one RAN operation performed by the wireless device may be configured;
information indicating whether the wireless device is or has been performing a RAN operation that is configured on the basis of an output of an ML model executed by the wireless device;
an identification of a RAN operation performed by the wireless device and that the wireless device has configured, or is operable to configure, on the basis of an output of an ML model executed by the wireless device;
an identification, for a RAN operation, of an ML model that the wireless device is configured to execute and on the basis of which the RAN operation may be configured;
an identification of information reported by the wireless device that is based on an output of an ML model executed by the wireless device;
information about an ML model that the wireless device is or has been configured to execute, wherein the ML model is operable to provide an output on the basis of which at least one RAN operation performed by the wireless device may be configured;
information about a capability of the wireless device to execute an ML model.

17. The method as claimed in claim 13, further comprising:
receiving the first request from the first RAN node, the first request requesting information indicating whether a wireless device is capable of executing an ML model that is operable to provide an output on the basis of which at least one RAN operation performed by the wireless device may be configured.

18. The method as claimed in claim 17, wherein the first request further comprises a request for supplementary ML model information.

19. A first Radio Access Network (RAN) node of a communication network comprising a RAN, wherein the first RAN node is for managing a wireless device that is operable to connect to the communication network, and wherein the first RAN node comprises processing circuitry configured to cause the first RAN node to:
receive, from a second RAN node in the communication network, information indicating whether a wireless device is capable of executing a Machine Learning (ML) model that is operable to provide an output on the basis of which at least one RAN operation performed by the wireless device may be configured, wherein receiving the information indicating whether the wireless device is capable of executing the ML model comprises receiving the information in a response to a first request.

20. A second Radio Access Network (RAN), node of a communication network comprising a RAN, wherein the second RAN node is for managing a wireless device that is operable to connect to the communication network, and wherein the second RAN node comprises processing cir- ⁵ cuitry configured to cause the second RAN node to:

send, to a first RAN node in the communication network, information indicating whether a wireless device is capable of executing a Machine Learning (ML) model that is operable to provide an output on the basis of ¹⁰ which at least one RAN operation performed by the wireless device may be configured, wherein sending the information indicating whether the wireless device is capable of executing the ML model comprises sending the information in a response to a first request. ¹⁵

<div align="center">

\*   \*   \*   \*   \*

</div>